(12) United States Patent
Yerramalli et al.

(10) Patent No.: US 11,051,181 B2
(45) Date of Patent: Jun. 29, 2021

(54) UPLINK TRANSMISSION ADAPTATION BASED ON TRANSMISSION CONFIGURATION STATE

(71) Applicant: QUALCOMM Incorporated, San Diego, CA (US)

(72) Inventors: Srinivas Yerramalli, San Diego, CA (US); Xiaoxia Zhang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/416,450

(22) Filed: May 20, 2019

(65) Prior Publication Data

US 2019/0387418 A1 Dec. 19, 2019

Related U.S. Application Data

(60) Provisional application No. 62/686,503, filed on Jun. 18, 2018.

(51) Int. Cl.
*H04W 4/00* (2018.01)
*H04W 16/28* (2009.01)
(Continued)

(52) U.S. Cl.
CPC ........ *H04W 16/28* (2013.01); *H04L 1/0003* (2013.01); *H04L 5/0051* (2013.01);
(Continued)

(58) Field of Classification Search
None
See application file for complete search history.

(56) References Cited

U.S. PATENT DOCUMENTS

2014/0056278 A1* 2/2014 Marinier ............ H04W 52/367
370/330
2014/0307643 A1* 10/2014 Froberg Olsson .... H04L 5/0053
370/329
(Continued)

FOREIGN PATENT DOCUMENTS

WO  WO-2014171869 A1  10/2014

OTHER PUBLICATIONS

International Search Report and Written Opinion—PCT/US2019/033223—ISA/EPO—dated Nov. 25, 2019.
(Continued)

*Primary Examiner* — Phuongchau Ba Nguyen
(74) *Attorney, Agent, or Firm* — Holland & Hart LLP

(57) ABSTRACT

Methods, systems, and devices for wireless communications are described that provide for configuring a user equipment (UE) with a number of uplink transmission configuration states that may be mapped to corresponding uplink transmission parameters. The uplink transmission parameters may be associated with one or more of a directional uplink transmission beam, a set of base stations that are to receive an uplink transmission for joint processing, uplink reference signal transmissions, or combinations thereof. An indication of a first uplink transmission configuration state may be provided to the UE, and the UE may transmit the uplink transmission based at least in part on a first set of uplink transmission parameters that are associated with the first uplink transmission configuration state.

30 Claims, 15 Drawing Sheets

(51) Int. Cl.
    *H04W 72/04*     (2009.01)
    *H04L 25/02*     (2006.01)
    *H04L 1/00*     (2006.01)
    *H04W 76/27*     (2018.01)
    *H04W 80/02*     (2009.01)
    *H04L 5/00*     (2006.01)

(52) U.S. Cl.
    CPC ....... *H04L 25/0226* (2013.01); *H04W 72/042* (2013.01); *H04W 72/046* (2013.01); *H04W 76/27* (2018.02); *H04W 80/02* (2013.01)

(56) References Cited

U.S. PATENT DOCUMENTS

| | | | |
|---|---|---|---|
| 2014/0341092 A1 | 11/2014 | Chu | |
| 2019/0230545 A1* | 7/2019 | Liou | .................... H04W 16/28 |
| 2019/0297640 A1* | 9/2019 | Liou | ................ H04W 72/1215 |
| 2019/0320469 A1* | 10/2019 | Huang | ................. H04L 5/0053 |
| 2020/0280409 A1* | 9/2020 | Grant | ................... H04L 5/0044 |

OTHER PUBLICATIONS

Partial International Search Report—PCT/US2019/033223—ISA/EPO—dated Sep. 30, 2019.

\* cited by examiner

UPLINK TRANSMISSION ADAPTATION BASED ON TRANSMISSION CONFIGURATION STATE

CROSS REFERENCES

The present Application for Patent claims the benefit of U.S. Provisional Patent Application No. 62/686,503 by Yerramalli et al., entitled "Uplink Transmission Adaptation Based on Transmission Configuration State," filed Jun. 18, 2018, assigned to the assignee hereof, and expressly incorporated herein.

BACKGROUND

The following relates generally to wireless communications, and more specifically to uplink transmission adaptation based on transmission configuration state.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some deployments, base stations and UEs may have relatively dense arrangements in which a relatively large number of UEs and base stations are located within a relatively small area. For example, in some dense urban environments or factory automation settings a relatively large number of devices (e.g., base stations and UEs) may be present in a small area. In such cases, UEs may be served by multiple different base stations over the course of relatively short time periods (e.g., when a traveling relatively short distances, or fast fading of signals due to movement of a UE or some other object relative to a UE and base station). Further, in some cases, joint processing may be used (e.g., coordinated multi-point (CoMP) techniques) for uplink and downlink transmissions between a UE and two or more base stations. When transmissions of a UE change between base stations, such as in a joint processing adjustment where a transmission beam or precoding may be adjusted based on particular base stations that are participating in joint processing transmissions, one or more parameters may be adjusted at the UE, base station, or both. Efficient techniques for adjusting parameters for transmissions between base stations and UEs in such situations may be desired and may enhance network efficiency.

SUMMARY

The described techniques relate to improved methods, systems, devices, and apparatuses that support uplink transmission adaptation based on transmission configuration state. Generally, the described techniques provide for configuring a user equipment (UE) with a number of uplink transmission configuration states that may be mapped to corresponding uplink transmission parameters. Such uplink transmission parameters may be associated with one or more of a directional uplink transmission beam, a set of base stations that are to receive an uplink transmission for joint processing, or combinations thereof. An indication of a first uplink transmission configuration state may be provided to the UE, and the UE may transmit the uplink transmission based at least in part on a first set of uplink transmission parameters that are associated with the first uplink transmission configuration state.

In some cases, the set of uplink transmission configuration states includes configuration states for uplink control channel transmissions (e.g., physical uplink control channel (PUCCH) transmissions), uplink shared channel transmissions (e.g., physical uplink shared channel (PUSCH) transmissions), sounding reference signal (SRS) transmissions, or combinations thereof. In some cases, the indication of the uplink transmission configuration state may be provided in downlink control information (DCI) for a downlink shared channel transmission (e.g., physical downlink shared channel (PDSCH) transmission). In some cases, the set of uplink transmission configuration states is configured via RRC signaling, and an indication of which uplink transmission configuration state is to be used for an uplink transmission may be indicated in DCI or in a medium access control (MAC) control element (CE).

A method of wireless communication is described. The method may include identifying, at a UE, a set of uplink transmission configuration states, each uplink transmission configuration state having a corresponding set of uplink transmission parameters associated with one or more of a directional uplink transmission beam or a set of base stations to jointly receive an uplink transmission, receiving an indication of a first uplink transmission configuration state of the set of uplink transmission configuration states for the uplink transmission, and transmitting the uplink transmission based on a first set of uplink transmission parameters that are associated with the first uplink transmission configuration state.

An apparatus for wireless communication is described. The apparatus may include a processor, memory in electronic communication with the processor, and instructions stored in the memory. The instructions may be executable by the processor to cause the apparatus to identify, at a UE, a set of uplink transmission configuration states, each uplink transmission configuration state having a corresponding set of uplink transmission parameters associated with one or more of a directional uplink transmission beam or a set of base stations to jointly receive an uplink transmission, receive an indication of a first uplink transmission configuration state of the set of uplink transmission configuration states for the uplink transmission, and transmit the uplink transmission based on a first set of uplink transmission parameters that are associated with the first uplink transmission configuration state.

Another apparatus for wireless communication is described. The apparatus may include means for identifying, at a UE, a set of uplink transmission configuration states, each uplink transmission configuration state having a corresponding set of uplink transmission parameters associated with one or more of a directional uplink transmission beam or a set of base stations to jointly receive an uplink transmission, receiving an indication of a first uplink transmission configuration state of the set of uplink transmission configuration states for the uplink transmission, and transmitting the uplink transmission based on a first set of uplink transmission parameters that are associated with the first uplink transmission configuration state.

A non-transitory computer-readable medium storing code for wireless communication is described. The code may include instructions executable by a processor to identify, at a UE, a set of uplink transmission configuration states, each uplink transmission configuration state having a corresponding set of uplink transmission parameters associated with one or more of a directional uplink transmission beam or a set of base stations to jointly receive an uplink transmission, receive an indication of a first uplink transmission configuration state of the set of uplink transmission configuration states for the uplink transmission, and transmit the uplink transmission based on a first set of uplink transmission parameters that are associated with the first uplink transmission configuration state.

In some examples of the method, apparatuses, and non-transitory computer-readable medium described herein, the set of uplink transmission configuration states includes configuration states for uplink control channel transmissions, uplink shared channel transmissions, SRS transmissions, or combinations thereof. In some examples of the method, apparatuses, and non-transitory computer-readable medium described herein, the set of uplink transmission parameters includes one or more of a payload configuration for control information to be transmitted in an uplink control channel transmission, a payload format for the control information, an uplink control channel format, a transmission power for the uplink transmission, a bandwidth for the uplink transmission, or any combinations thereof.

In some examples of the method, apparatuses, and non-transitory computer-readable medium described herein, the identifying the set of uplink transmission configuration states may include operations, features, means, or instructions for receiving, for each uplink transmission configuration state of the set of uplink transmission configuration states, a corresponding set of uplink transmission parameters. In some examples of the method, apparatuses, and non-transitory computer-readable medium described herein, the receiving may be via RRC signaling or a medium access control (MAC) control element (CE). In some examples of the method, apparatuses, and non-transitory computer-readable medium described herein, the indication of the first uplink transmission configuration state may be received in downlink control information associated with a downlink transmission from a base station. In some examples of the method, apparatuses, and non-transitory computer-readable medium described herein, the downlink control information includes a first downlink transmission configuration indication (TCI) that indicates one or more receive parameters for receiving a PDSCH transmission, and where the first uplink transmission configuration state may be mapped to the first TCI.

In some examples of the method, apparatuses, and non-transitory computer-readable medium described herein, the uplink transmission may be a semi-persistent scheduling (SPS) transmission via a PUSCH, and where the set of uplink transmission parameters includes one or more of a modulation and coding scheme (MCS) for the uplink transmission, resource allocation for the uplink transmission, a transmission power for the uplink transmission, or any combinations thereof.

In some examples of the method, apparatuses, and non-transitory computer-readable medium described herein, the receiving the indication of the first uplink transmission configuration state may include operations, features, means, or instructions for receiving a medium access control (MAC) control element (CE) command or DCI that indicates the first uplink transmission configuration state. In some examples of the method, apparatuses, and non-transitory computer-readable medium described herein, the indication of the first uplink transmission configuration state may be received in a group common DCI transmission.

In some examples of the method, apparatuses, and non-transitory computer-readable medium described herein, the uplink transmission may be a SRS transmission, and where two or more of the uplink configuration states of the set of uplink transmission configuration states correspond to two or more different SRS configurations. In some examples of the method, apparatuses, and non-transitory computer-readable medium described herein, the transmitting may include operations, features, means, or instructions for transmitting a first SRS based on the first uplink transmission configuration state, and transmitting one or more other SRSs based on one or more other uplink configuration states of the set of uplink transmission configuration states.

A method of wireless communication is described. The method may include configuring, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission, transmitting an indication of a first uplink transmission configuration state of the set of uplink transmission configuration states for the uplink transmission, and receiving the uplink transmission based on a first set of uplink transmission parameters that are associated with the first uplink transmission configuration state.

An apparatus for wireless communication is described. The apparatus may include a processor, memory in electronic communication with the processor, and instructions stored in the memory. The instructions may be executable by the processor to cause the apparatus to configure, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission, transmit an indication of a first uplink transmission configuration state of the set of uplink transmission configuration states for the uplink transmission, and receive the uplink transmission based on a first set of uplink transmission parameters that are associated with the first uplink transmission configuration state.

Another apparatus for wireless communication is described. The apparatus may include means for configuring, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission, transmitting an indication of a first uplink transmission configuration state of the set of uplink transmission configuration states for the uplink transmission, and receiving the uplink transmission based on a first set of uplink transmission parameters that are associated with the first uplink transmission configuration state.

A non-transitory computer-readable medium storing code for wireless communication is described. The code may include instructions executable by a processor to configure, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission, transmit an indication of a first uplink transmission configuration state of the set of uplink transmission configuration states for the uplink transmission, and receive the uplink transmission based on a first set of uplink transmission parameters that are associated with the first uplink transmission configuration state.

In some examples of the method, apparatuses, and non-transitory computer-readable medium described herein, the set of uplink transmission configuration states includes uplink configuration states for uplink control channel transmissions, uplink shared channel transmissions, SRS transmissions, or combinations thereof. In some examples of the method, apparatuses, and non-transitory computer-readable medium described herein, the set of uplink transmission parameters includes one or more of a payload configuration for uplink control information to be transmitted in the uplink transmission, a payload format for the uplink control information, an uplink control channel format, a transmission power for the uplink transmission, a bandwidth for the uplink transmission, or any combinations thereof.

In some examples of the method, apparatuses, and non-transitory computer-readable medium described herein, the transmitting the indication of the first uplink transmission configuration state may include operations, features, means, or instructions for transmitting downlink control information that includes a first downlink transmission configuration indication (TCI) for an associated PDSCH transmission, and where the first uplink transmission configuration state may be mapped to the first downlink TCI. In some examples of the method, apparatuses, and non-transitory computer-readable medium described herein, the configuring the set of uplink transmission configuration states may include operations, features, means, or instructions for transmitting to the UE, via RRC signaling or a medium access control (MAC) control element (CE), a corresponding set of uplink transmission parameters for each uplink configuration state of the set of uplink transmission configuration states.

Some examples of the method, apparatuses, and non-transitory computer-readable medium described herein may further include operations, features, means, or instructions for providing the received uplink transmission to a base station controller for joint processing of another reception of the uplink transmission by a second base station.

In some examples of the method, apparatuses, and non-transitory computer-readable medium described herein, the uplink transmission may be a semi-persistent scheduling (SPS) transmission via a PUSCH, and where the set of uplink transmission parameters includes one or more of a modulation and coding scheme (MCS) for the uplink transmission, resource allocation for the uplink transmission, a transmission power for the uplink transmission, or any combinations thereof. In some examples of the method, apparatuses, and non-transitory computer-readable medium described herein, the transmitting the indication of the first uplink transmission configuration state may include operations, features, means, or instructions for transmitting a medium access control (MAC) control element (CE) command or DCI that indicates the first transmission configuration state. In some examples of the method, apparatuses, and non-transitory computer-readable medium described herein, the indication of the first uplink transmission configuration state may be provided in a group common DCI transmission.

In some examples of the method, apparatuses, and non-transitory computer-readable medium described herein, the uplink transmission may be a SRS transmission, and where each uplink transmission configuration state of the set of uplink transmission configuration states corresponds to a different SRS configuration. In some examples of the method, apparatuses, and non-transitory computer-readable medium described herein, the receiving the uplink transmission includes receiving, from the UE, a first SRS based on the first uplink transmission configuration state and one or more other SRSs based on one or more other uplink transmission configuration states of the set of transmission configuration states. Some examples of the method, apparatuses, and non-transitory computer-readable medium described herein may further include operations, features, means, or instructions for determining one or more downlink transmission parameters for downlink transmission to the UE based on the first SRS and the one or more other SRSs received from the UE.

DETAILED DESCRIPTION

Figure 1:
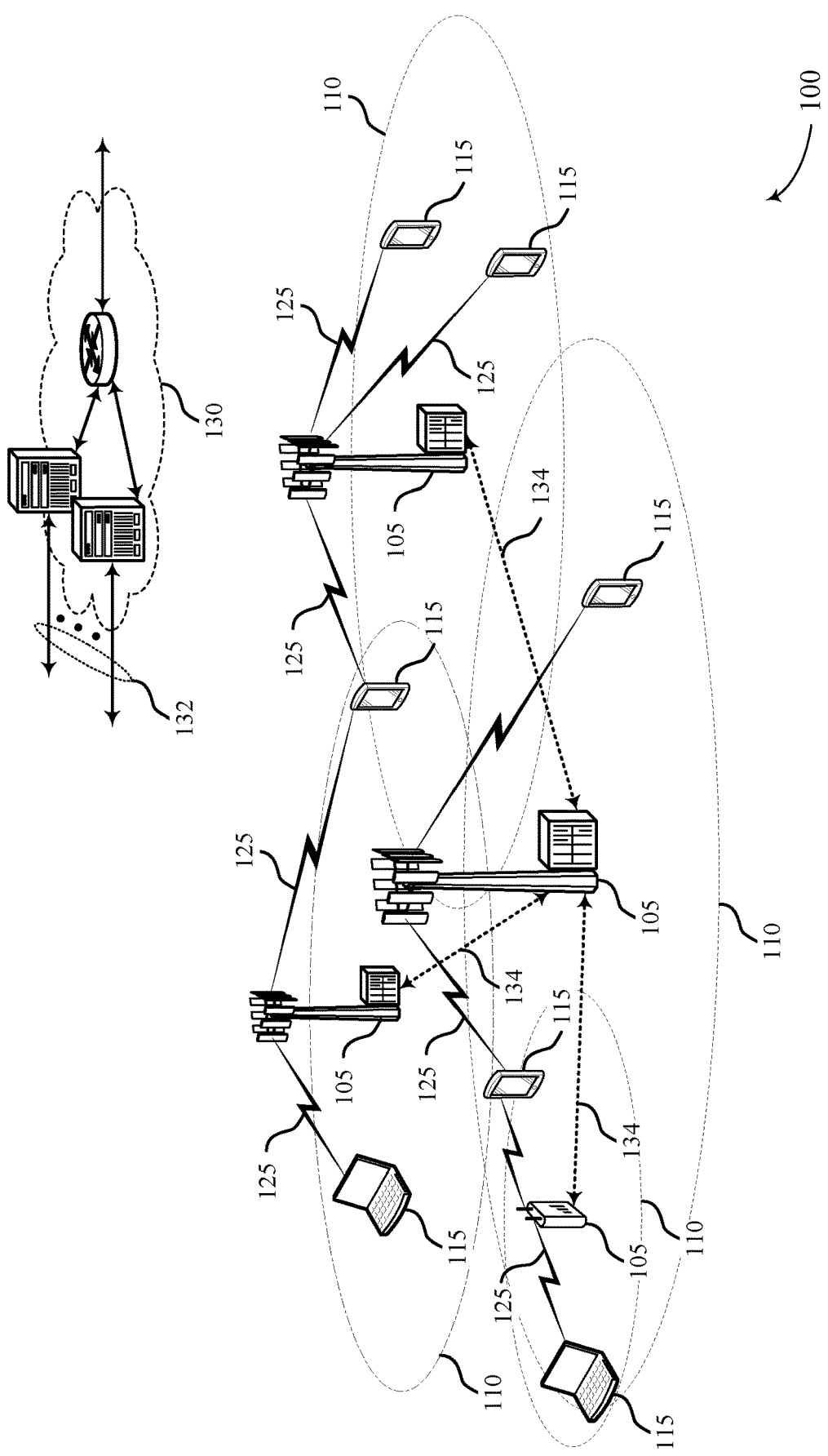
FIG. 1 illustrates an example of a system for wireless communications that supports uplink transmission adaptation based on transmission configuration state in accordance with aspects of the present disclosure.

In various aspects of the disclosure, wireless communications may occur in a relatively dense deployment in which transmission parameters of a user equipment (UE) may be adjusted relatively frequently as the UE moves, channel conditions at the UE change, or combinations thereof. In some cases, the UE may be configured with a number of uplink transmission configuration states. Each of the uplink transmission configuration states may be mapped to one or more corresponding uplink transmission parameters. Such uplink transmission parameters may be associated with one or more of a directional uplink transmission beam, a set of base stations that are to receive an uplink transmission for joint processing, uplink reference signal (e.g., sounding reference signal (SRS)) configurations, or combinations thereof. An indication of a first uplink transmission configuration state may be provided to the UE, and the UE may transmit the uplink transmission based at least in part on a first set of uplink transmission parameters that are associated with the first uplink transmission configuration state.

In some cases, the set of uplink transmission configuration states includes configuration states for uplink control channel transmissions (e.g., physical uplink control channel (PUCCH) transmissions), uplink shared channel transmissions (e.g., physical uplink shared channel (PUSCH) transmissions), sounding reference signal (SRS) transmissions, or combinations thereof. In some cases, the indication of the uplink transmission configuration state may be provided in downlink control information (DCI) for a downlink shared channel transmission (e.g., physical downlink shared channel (PDSCH) transmission). In some cases, the set of uplink transmission configuration states is configured via RRC signaling, and an indication of which uplink transmission configuration state is to be used for an uplink transmission may be indicated in DCI or in a medium access control (MAC) control element (CE).

Such techniques may allow for efficient adjustments to UE transmission parameters as the UE moves within wireless communications system, when channel conditions in the wireless communications system change, or combinations thereof. For example, in some cases base stations and UEs may have relatively dense arrangements in which a relatively large number of UEs and base stations are located within a relatively small area. For example, in some dense urban environments or factory automation settings a relatively large number of devices (e.g., base stations and UEs) may be present in a small area. In such cases, the UE may be served by multiple different base stations over the course of a relatively short time periods. For example, in a factory automation setting, a UE at a first location may be efficiently served through joint processing or coordinated multi-point (CoMP) techniques with a first and a second base station. However, when the UE moves a relatively short distance to a second location, the UE may be more efficiently served by a single third base station or a different set of base stations that perform joint processing. Additionally, in some cases, channels in a dense environment may experience relatively fast fading, such as in cases where a vehicle or piece of equipment causes interference or blocking of a signal between the UE and a base station. Techniques such as discussed herein may allow a UE to be configured with multiple sets of uplink transmission parameters, and one set of parameters may be selected for uplink transmissions and indicated to the UE simply by indicating an uplink transmission configuration state associated with the selected set of parameters. Such techniques allow efficient adjustments of transmission parameters with relatively low signaling overhead for initiating changes in transmission parameters.

Aspects of the disclosure are initially described in the context of a wireless communications system. Aspects of the disclosure are further illustrated by and described with reference to apparatus diagrams, system diagrams, and flowcharts that relate to uplink transmission adaptation based on transmission configuration state.

FIG. 1 illustrates an example of a wireless communications system 100 that supports uplink transmission adaptation based on transmission configuration state in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, wireless communications system 100 may have a relatively dense deployment, and efficient adaptation of transmission parameters for UEs 115 may help enhance network throughput and reliability.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, one or more UEs 115 may be configured with a number of uplink transmission configuration states that may be mapped to corresponding uplink transmission parameters. Such uplink transmission parameters may be associated with one or more of a directional uplink transmission beam, a set of base stations 105 that are to receive an uplink transmission for joint processing, one or more uplink control channel transmission parameters, one or more uplink shared channel transmission parameters, one or more uplink reference signal (e.g., SRS) parameters, or combinations thereof. An indication of a first uplink transmission configuration state may be provided to the UE 115, and the UE 115 may transmit the uplink transmission based at least in part on a first set of uplink transmission parameters that are associated with the first uplink transmission configuration state.

Figure 2:
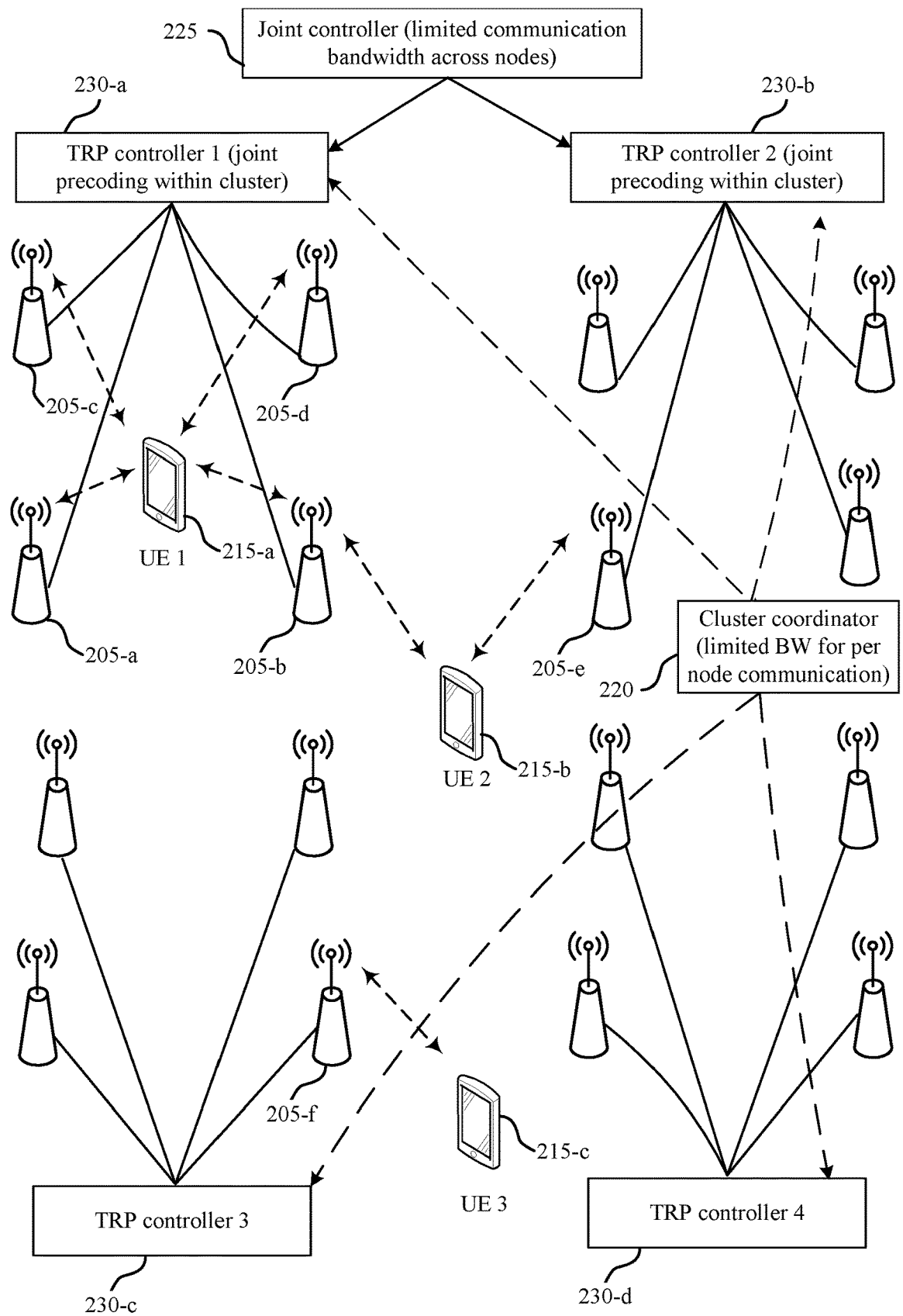
FIG. 2 illustrates an example of a high density deployment wireless communications system that supports uplink transmission adaptation based on transmission configuration state in accordance with aspects of the present disclosure.

FIG. 2 illustrates an example of a wireless communications system 200 that supports uplink transmission adaptation based on transmission configuration state in accordance with aspects of the present disclosure. In some examples, wireless communications system 200 may implement aspects of wireless communications system 100. Wireless communications system 200 may include a number of base stations 205 and UEs 215, which may be examples of the corresponding devices described herein. Broadly, wireless communications system 200 illustrates one example of an environment where efficient adaptation or transmission parameters may be utilized, such as in factory automation settings or other dense deployment settings.

In this example, a cluster coordinator 220 may be coupled with a number of TRP controllers 230. In some cases, TRP controllers 230 may manage transmissions of multiple base stations 205 (which may also be referred to as TRPs) and may employ joint transmission techniques such as uplink or downlink CoMP to enhance reliability of uplink and downlink transmissions. In the example of FIG. 2, a joint controller 225 may be coupled with a first TRP controller 230-a and a second TRP controller 230-b, and may provide limited connection bandwidth across the connected nodes. The joint controller 225, in some cases, may allow for joint processing across base stations 205 that are connected to the different TRP controllers 230 that are coupled thereto. In some cases, the cluster coordinator 220 may be coupled with a relatively large number of TRP controllers 230, and may not provide sufficient bandwidth per TRP controller 230 to support joint processing across base stations 205.

By way of example only, a first UE 215-a may be located in proximity to a first base station 205-a, a second base station 205-b, a third base station 205-c, and a fourth base station 205-d, which may each be coupled with a first TRP controller 230-a. In such cases, the first UE 215-a may be jointly served, such as through downlink CoMP, uplink CoMP, or combinations thereof, by the first through fourth base stations 205-a-205-d, and the first TRP controller 230-d may manage joint processing and operations. Such joint processing of the first UE 215-a may be achieved through setting a first set of transmission parameters, which may provide for joint precoding for example. Additionally, in this example, a second UE 215-b may be located in proximity to the first base station 205-a and a fifth base station 205-e. In this example, the joint controller 225 may allow for joint processing across clusters through connections with both the first TRP controller 230-a and a second TRP controller 230-b. Such joint processing of the second UE 215-b may be achieved through setting a second set of transmission parameters, which may provide for joint precoding across the first base station 205-b and the fifth base station 205-e, for example. The third UE 215-c, in this example, may be in proximity to a sixth base station 205-f, but may not be in close enough proximity to other base stations 205 that are able to support joint processing, and thus joint processing may not be employed in this case. In some cases, two or more base stations 205 may receive transmissions of the third UE 215-c, and the network may process each base station 205 individually and data may be combined at a higher layer.

Although three UEs 215 and four TRP clusters with four base stations 205 each are shown in this example, it is to be understood that more or fewer UEs 215 and base stations 205 may be utilized in accordance with aspects of the present disclosure. In one non-limiting example, a factory automation setting may include hundreds or even thousands of UEs 215, and may include dozens or even hundreds of base stations 205.

In some cases, one or more of the UEs 215 may be configured with a number of transmission states, and each transmission state may have a number of associated transmission parameters. In indication of a transmission state may be provided to a UE 215 that indicates which set of transmission parameters are to be used at the UE 215. In some cases, downlink transmission states may be indicated through a downlink transmission configuration indication (TCI) state. For example, a first TCI state indication may enable the UE 215 to know which set of reference signals the downlink transmission is Quasi-Co-Located (QCL) with, in a deployment that utilizes beamforming. In some examples, the downlink TCI state may be signaled in a PDCCH transmission for the corresponding PDSCH demodulation, and the UE 215 may use the indication to determine which reference resources are used for delay spread, Doppler and time/frequency offset compensation for PDSCH decoding. In some cases, different downlink TCI states may be associated with different transmission beams or groups of TRPs. In some examples, two or more downlink TCI states may be associated with different downlink transmission beams. Additionally or alternatively, two or more downlink TCI states may be associated with different sets or clusters of TRPs used for transmission at the base station 205 side (e.g., TCI state 1=joint transmission from the first base station 205-a and second base station 205-b; TCI state 2=joint transmission from first base station 205-a, second base station 205-b, third base station 205-c, and fourth base station 205-d, etc.)

According to various aspects of the present disclosure, uplink transmission configuration states may be established that are mapped to uplink transmission parameters, such as parameters for PUSCH transmissions, PUCCH transmissions, uplink reference signal transmissions (e.g., SRS), or combinations thereof. In some cases, each uplink transmission configuration state may reflect the kind of processing that would be done on the network side. For example, a first uplink transmission configuration state may allow the network to perform joint processing of the received uplink signal across a first number of TRPs (e.g., across four TRPs), a second uplink transmission configuration state may allow the network to perform joint processing of the received uplink signal across a second number of TRPs (e.g., across two TRPs), and a third uplink transmission configuration state may allow the network to processes each TRP individually and uplink data may be combined at higher layers. In some cases, the network side processing may be transparent to the UE 215, as the UE 215 may simply transmit the uplink transmission in accordance with transmission parameters of the indicated uplink transmission configuration state.

In some cases, the uplink transmission configuration state may be associated with PUSCH transmissions. In such cases, the uplink transmission configuration state may be used to indicate a modulation and coding scheme (MCS), resource allocation, transmit power and other transmission parameters. In some cases, the parameters for each uplink transmission configuration state can be configured to the UE and the change of uplink transmission configuration state can be signaled through a MAC-CE command or DCI. In some cases, configurations may be provided for uplink grant-free (or autonomous uplink (AUL)) transmissions, where the transmission parameters are conditioned on a signaled uplink transmission configuration state. In some cases, the uplink transmission of the UE may be scheduled according to a semi-persistent scheduling (SPS) configuration. In such cases, the uplink transmission configuration state may be provided in a new activation/de-activation DCI, and thus the preconfigured parameters for the uplink transmission may be signaled using a smaller number of bits. In some cases, SPS signaling for multiple UEs can be in a same group common DCI, and thus overhead associated with SPS activation/de-activation may be reduced.

In some cases, the uplink transmission configuration state may be associated with PUCCH transmissions. In such cases, the uplink transmission configuration state may be used to indicate a specific payload configuration for PUCCH. Additionally or alternatively, uplink transmission configuration states may be provided for aperiodic channel state information (A-CSI) or semi-persistent CSI (SP-CSI) uplink transmissions on PUSCH. In some cases, different downlink PDSCH TCI configurations can be used to indicate uplink transmission configuration states, and may trigger different PUCCH formats, payload formats, uplink transmission power, uplink transmission bandwidth, or any combinations thereof, based on parameters that are mapped to the indicated uplink transmission configuration state. Thus, the uplink transmission configuration state indicator may be used to quickly adapt PUCCH configurations by linking them with the PDSCH TCI state without an RRC reconfiguration command.

In some cases, the uplink transmission configuration state may be associated with SRS transmissions. In such cases, the uplink transmission configuration state may be used to indicate an SRS configuration which a UE 215 may use to sound on the uplink, thus allowing the SRS configuration to be changed dynamically. For example, a UE 215 may cycle through the SRS transmission for all the activated uplink transmission configuration states and then repeat this procedure periodically. By updating the uplink transmission configuration states (or changing the configuration of uplink transmission configuration states), a base station 205 can receive sounding in various SRS configurations in a time division multiplexing (TDM) fashion periodically. Such a procedure may be useful as a UE 215 moves through a dense network of TRPs and a base station 205 may not want to reconfigure the UE 215 each time there is a change in the set of TRPs which the UE 215 sees.

Figure 3:
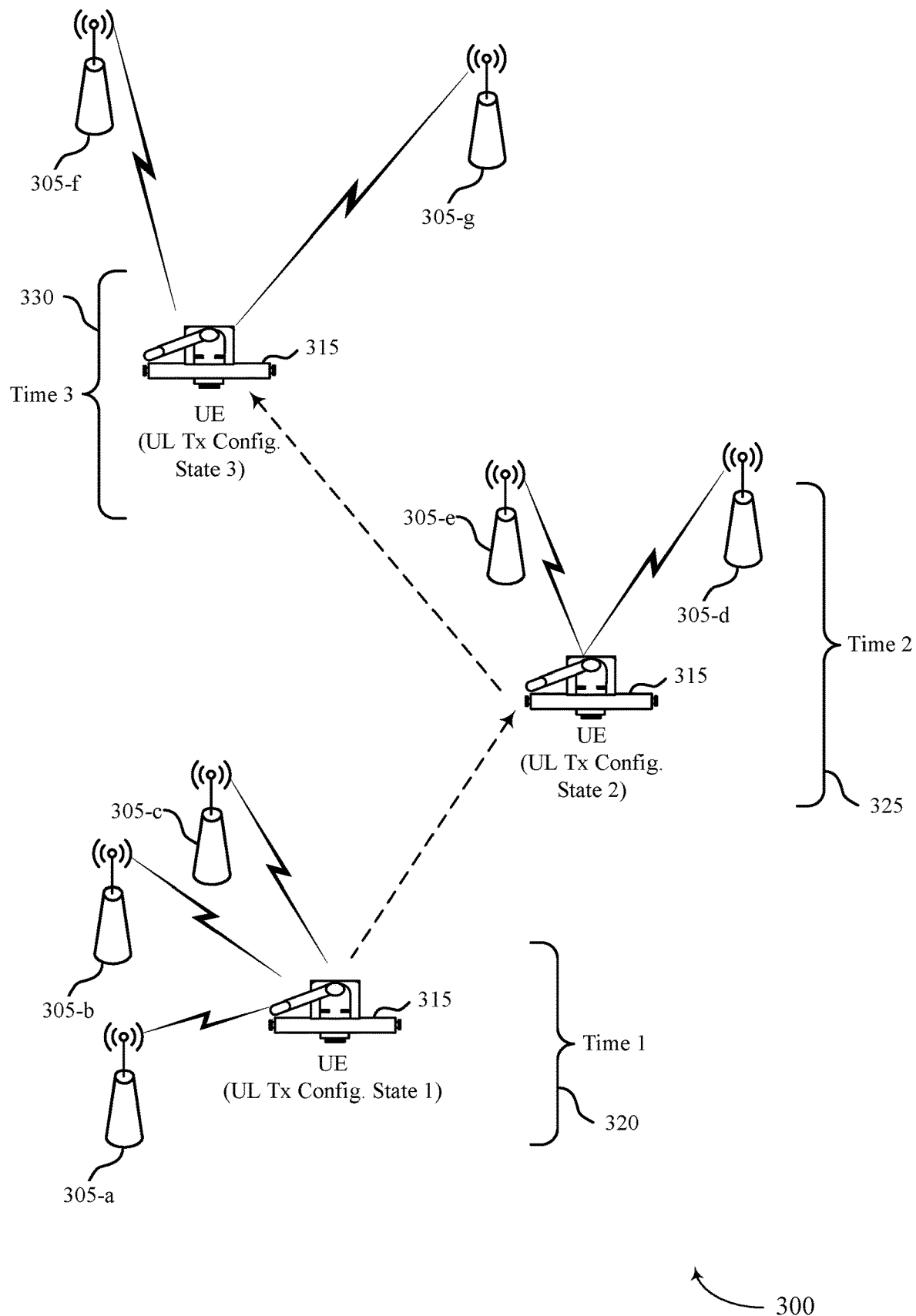
FIG. 3 illustrates an example of a UE movement in a dense deployment that supports uplink transmission adaptation based on transmission configuration state in accordance with aspects of the present disclosure.

FIG. 3 illustrates an example of a UE movement in a dense deployment 300 that supports uplink transmission adaptation based on transmission configuration state in accordance with aspects of the present disclosure. In some examples, the dense deployment 300 may implement aspects of wireless communications system 100 or 200. In this example, a UE 315 may be a piece of equipment in a factory automation setting, and at a first time 320 be in proximity with a first base station 305-a, a second base station 305-b, and a third base station 305-c. In such a case, the UE 315 may be signaled to indicate a first uplink transmission configuration state that provides uplink parameters for uplink transmissions that are jointly processed by a TRP controller that is coupled with the first base station 305-a, second base station 305-b, and third base station 305-c.

At some later second time 325, the UE 315 may have moved such that it is in proximity with a fourth base station 305-d and a fifth base station 305-e. In this case, the UE 315 may be signaled (e.g., via DCI for a PDSCH transmission) to indicate a second uplink transmission configuration state that provides uplink parameters for uplink transmissions that are jointly processed by a second TRP controller that is coupled with the fourth base station 305-d and fifth base station 305-e. Continuing with this example, the UE 315 may at a third time 330 have moved such that it is in proximity with a sixth base station 305-f and a seventh base station 305-g. In this case, the sixth base station 305-f and seventh base station 305-g may not be coupled to a TRP controller that can provide joint processing, and the UE 315 may be signaled to indicate a third uplink transmission configuration state that provides uplink parameters for uplink transmissions that may not be coherently received at the sixth base station 305-f and seventh base station 305-g. Thus, the UE 315 may transmit uplink transmissions according to a number of different uplink transmission parameters simply through the indication of the uplink transmission configuration state, which thus provides efficient uplink transmission adaptation with relatively low overhead. In some cases, the UE 315 may be configured with the set of uplink transmission configuration states and associated uplink transmission parameters for each state via RRC signaling prior to the first time 320.

Figure 4:
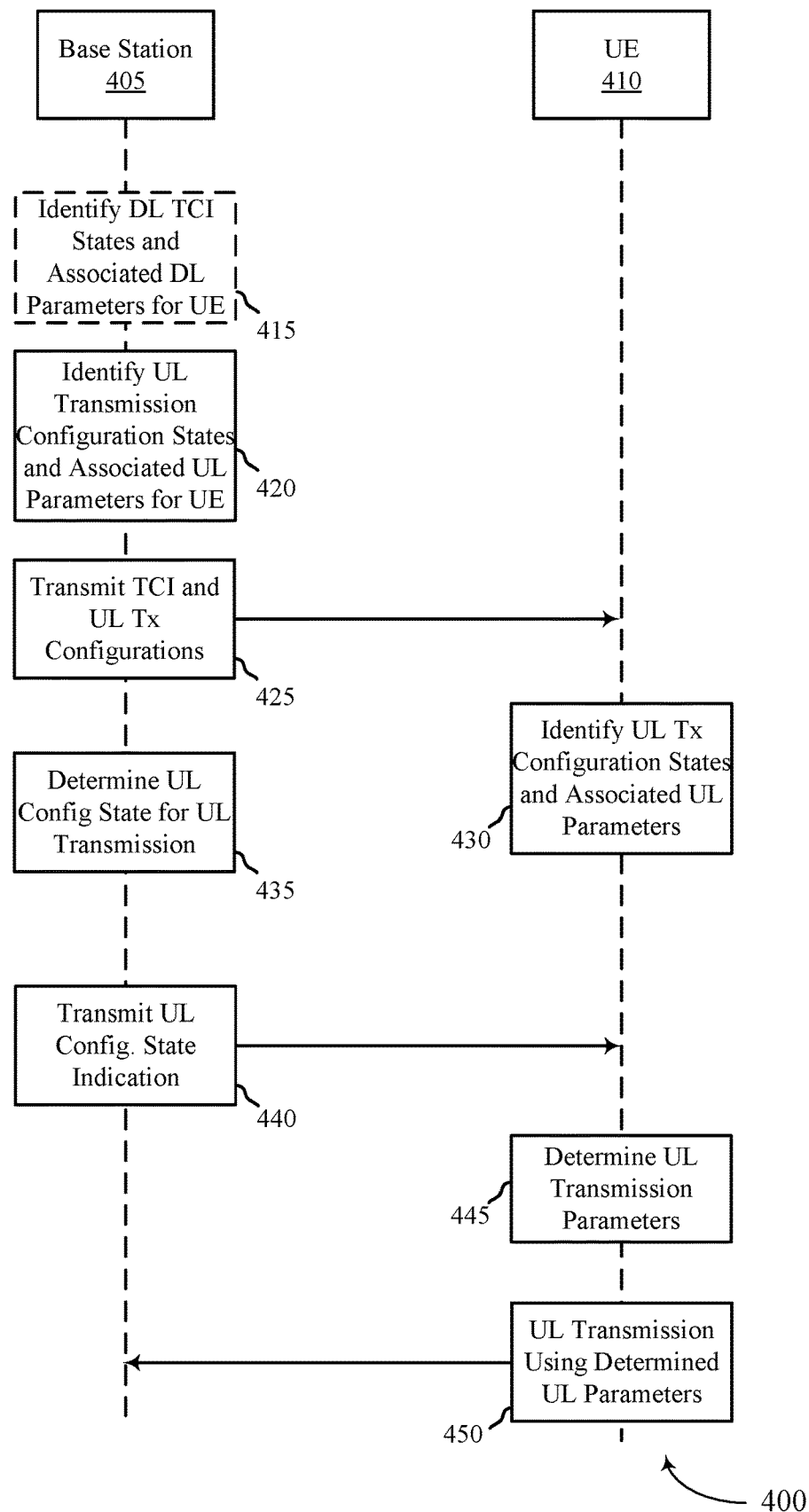
FIG. 4 illustrates an example of a process flow that supports uplink transmission adaptation based on transmission configuration state in accordance with aspects of the present disclosure.

FIG. 4 illustrates an example of a process flow 400 that supports uplink transmission adaptation based on transmission configuration state in accordance with aspects of the present disclosure. In some examples, process flow 400 may implement aspects of wireless communications system 100, 200, or 300. Process flow 400 may include a base station 405 and a UE 410, which may be examples of corresponding devices described herein.

At 415, base station 405 may optionally identify a number of different downlink TCI states and associated downlink transmission parameters for the UE 410. The downlink TCI states may provide, for example a number of different available beamforming parameters, precoding indicators, or combinations thereof, that the UE 410 may use to receive and process downlink transmissions from the base station 405.

At 420, the base station 405 may identify a number of different uplink transmission configuration states and associated uplink transmission parameters for the UE 410. The uplink transmission configuration states may provide, for example a number of different available beamforming parameters, precoding indicators, or combinations thereof, that the UE 410 may use to process and transmit uplink control channel transmissions, uplink shared channel transmissions, uplink reference signal transmissions, or any combinations thereof.

At 425, the base station 405 may transmit the optional downlink TCI states and the uplink transmission configuration states, along with the corresponding sets of transmission parameters that are mapped to each state, to the UE 410. In some cases, the transmission at 425 may be via RRC signaling that provides the information to the UE 410. In some cases, the RRC signaling may be transmitted in connection with a connection establishment procedure or a connection reestablishment procedure.

At 430, the UE 410 may identify the uplink transmission configuration states and associated sets of uplink transmission parameters that are mapped to each of the uplink transmission configuration states. In cases where downlink TCI states and associated parameters are provided, the UE 410 may identify the downlink TCI states and associated sets of downlink transmission parameters. In some cases, the UE 410 may store the different states and transmission parameters in a table in memory.

At 435, the base station 405 may determine an uplink configuration state for uplink transmissions of the UE 410. In some cases, the base station 405 may make such a determination based on one or more uplink reference signals transmitted by the UE 410, or based on channel state information and associated channel measurements that may be provided by the UE 410. In some cases, the base station 405 may be coupled with a TRP controller that manages joint processing of transmissions and received signals across multiple base stations, and the determination of the uplink transmission configuration state may be based on whether joint processing is to be performed on the uplink transmissions, which other base stations are to be involved with the joint processing, channel conditions at the UE, etc., or any combinations thereof.

At 440, the base station 405 may transmit an indication of the uplink transmission configuration state to the UE 410. In some cases, the indication may be transmitted in DCI that is associated with a PDSCH transmission to the UE 410. In some cases, the DCI may indicate a downlink TCI for the UE 410, and the uplink transmission configuration state may be determined based on the downlink TCI. In some cases, downlink TCI states may be mapped to different uplink transmission configuration states. In some cases, the indication of the uplink transmission configuration state may be transmitted in a MAC-CE that is transmitted to the UE 410.

At 445, the UE 410 may determine the uplink transmission parameters. In some cases, the UE 410 may determine the uplink transmission parameters as a set of uplink transmission parameters that are associated with the indicated uplink transmission configuration state. In some cases, the uplink parameters may be transmission parameters for PUSCH transmissions, PUCCH transmissions, uplink reference signal transmissions, or any combinations thereof.

At 450, the UE 410 may transmit the uplink transmission to the base station 405 using the determined uplink transmission parameters. In some cases, the uplink transmission may be received at multiple base stations that may perform joint processing on the uplink transmissions from the UE 410.

Figure 5:
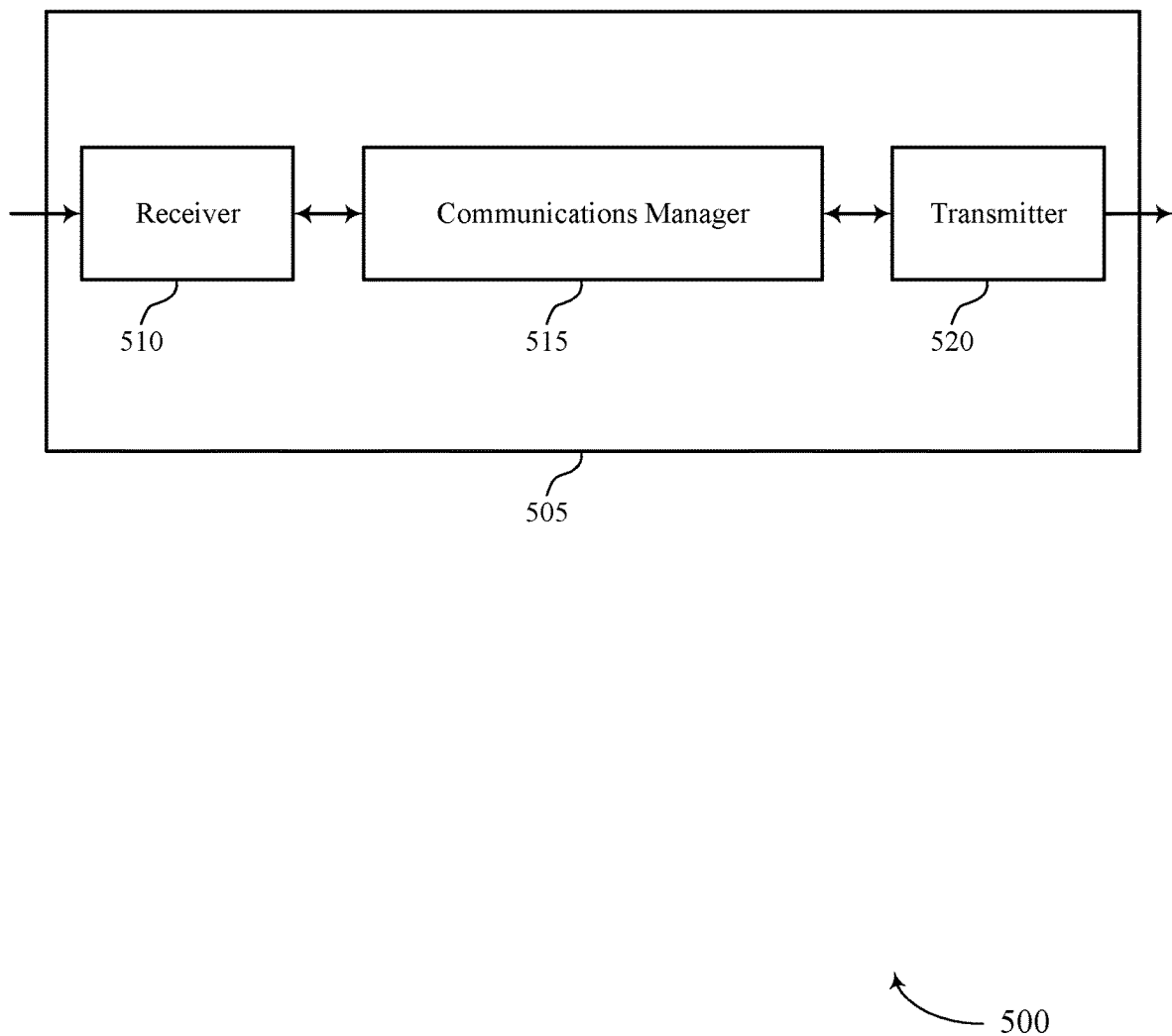
FIGS. 5 and 6 show block diagrams of devices that support uplink transmission adaptation based on transmission configuration state in accordance with aspects of the present disclosure.

FIG. 5 shows a block diagram 500 of a device 505 that supports uplink transmission adaptation based on transmission configuration state in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink transmission adaptation based on transmission configuration state, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify, at a UE, a set of uplink transmission configuration states, each uplink transmission configuration state having a corresponding set of uplink transmission parameters associated with one or more of a directional uplink transmission beam or a set of base stations to jointly receive an uplink transmission, receive an indication of a first uplink transmission configuration state of the set of uplink transmission configuration states for the uplink transmission, and transmit the uplink transmission based on a first set of uplink transmission parameters that are associated with the first uplink transmission configuration state. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
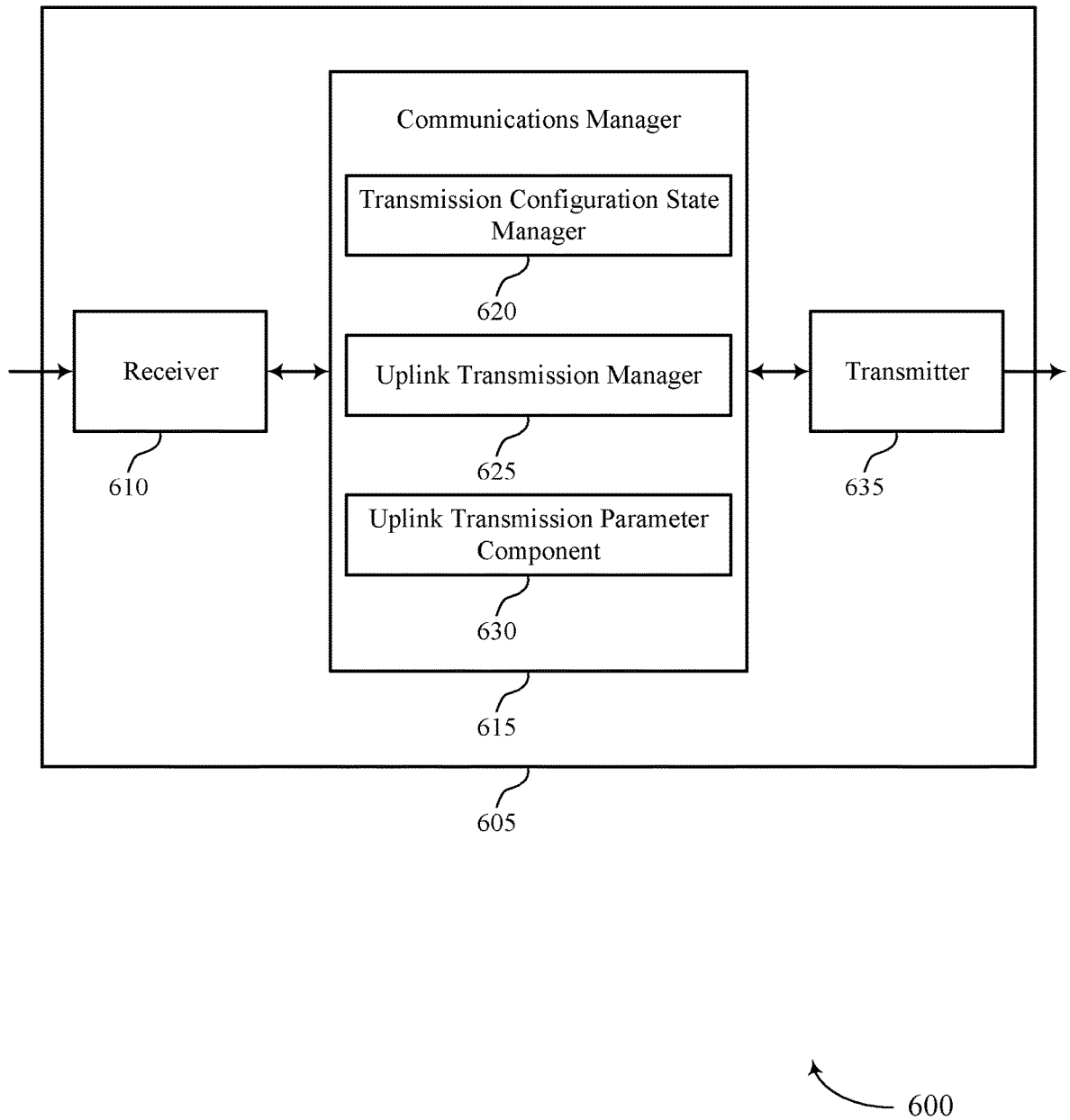

FIG. 6 shows a block diagram 600 of a device 605 that supports uplink transmission adaptation based on transmission configuration state in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink transmission adaptation based on transmission configuration state, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a transmission configuration state manager 620, an uplink transmission manager 625, and an uplink transmission parameter component 630. The communications manager 615 may be an example of aspects of the communications manager 810 described herein.

The transmission configuration state manager 620 may identify, at a UE, a set of uplink transmission configuration states, each uplink transmission configuration state having a corresponding set of uplink transmission parameters associated with one or more of a directional uplink transmission beam or a set of base stations to jointly receive an uplink transmission.

The uplink transmission manager 625 may receive an indication of a first uplink transmission configuration state of the set of uplink transmission configuration states for the uplink transmission.

The uplink transmission parameter component 630 may transmit the uplink transmission based on a first set of uplink transmission parameters that are associated with the first uplink transmission configuration state.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
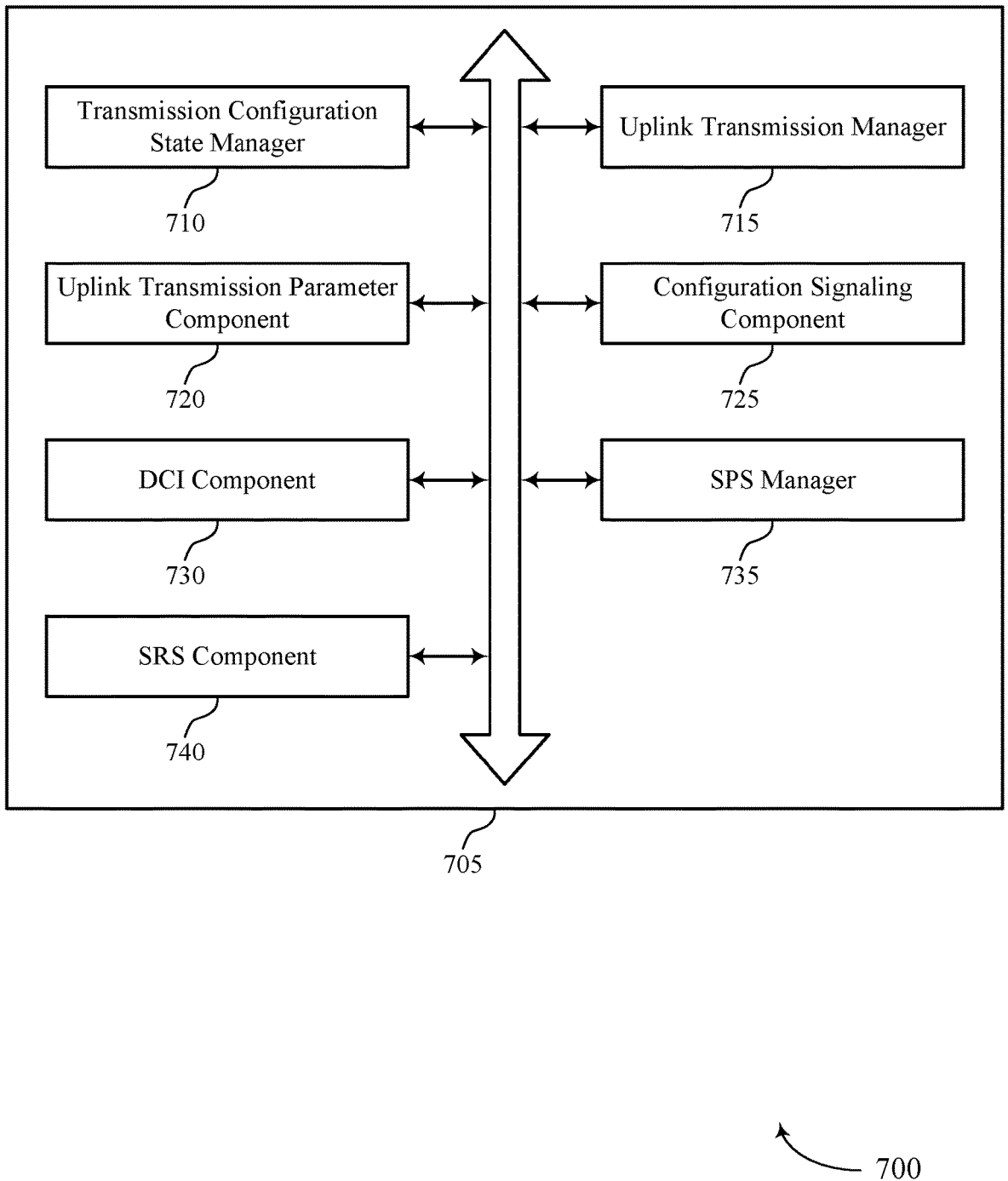
FIG. 7 shows a block diagram of a communications manager that supports uplink transmission adaptation based on transmission configuration state in accordance with aspects of the present disclosure.

FIG. 7 shows a block diagram 700 of a communications manager 705 that supports uplink transmission adaptation based on transmission configuration state in accordance with aspects of the present disclosure. The communications manager 705 may be an example of aspects of a communications manager 515, a communications manager 615, or a communications manager 810 described herein. The communications manager 705 may include a transmission configuration state manager 710, an uplink transmission manager 715, an uplink transmission parameter component 720, a configuration signaling component 725, a DCI component 730, a SPS manager 735, and a SRS component 740. Each of these modules may communicate, directly or indirectly, with one another (e.g., via one or more buses).

The transmission configuration state manager 710 may identify, at a UE, a set of uplink transmission configuration states, each uplink transmission configuration state having a corresponding set of uplink transmission parameters associated with one or more of a directional uplink transmission beam or a set of base stations to jointly receive an uplink transmission. In some examples, the transmission configuration state manager 710 may receive, for each uplink transmission configuration state of the set of uplink transmission configuration states, a corresponding set of uplink transmission parameters. In some cases, the set of uplink transmission configuration states includes configuration states for uplink control channel transmissions, uplink shared channel transmissions, SRS transmissions, or combinations thereof.

The uplink transmission manager 715 may receive an indication of a first uplink transmission configuration state of the set of uplink transmission configuration states for the uplink transmission.

The uplink transmission parameter component 720 may transmit the uplink transmission based on a first set of uplink transmission parameters that are associated with the first uplink transmission configuration state. In some cases, the set of uplink transmission parameters includes one or more of a payload configuration for control information to be transmitted in an uplink control channel transmission, a payload format for the control information, an uplink control channel format, a transmission power for the uplink transmission, a bandwidth for the uplink transmission, or any combinations thereof.

The configuration signaling component 725 may, in some cases, receive, via RRC signaling or a medium access control (MAC) control element (CE), configuration information that provides the sets of uplink transmission parameters that are associated with each of the uplink transmission configuration states.

The DCI component 730 may, in some cases, receive the indication of the first uplink transmission configuration state via downlink control information associated with a downlink transmission from a base station. In some cases, the downlink control information includes a first downlink transmission configuration indication (TCI) that indicates one or more receive parameters for receiving a PDSCH transmission, and where the first uplink transmission configuration state is mapped to the first TCI.

The SPS manager 735 may receive a medium access control (MAC) control element (CE) command or DCI that indicates the first uplink transmission configuration state. In some cases, the uplink transmission is a semi-persistent scheduling (SPS) transmission via a PUSCH, and the set of uplink transmission parameters includes one or more of a MCS for the uplink transmission, resource allocation for the uplink transmission, a transmission power for the uplink transmission, or any combinations thereof. In some cases, the indication of the first uplink transmission configuration state is received in a group common DCI transmission.

The SRS component 740 may transmit a first SRS based on the first uplink transmission configuration state, and transmit one or more other SRSs based on one or more other uplink configuration states of the set of uplink transmission configuration states. In some cases, the uplink transmission is a SRS transmission, and where two or more of the uplink configuration states of the set of uplink transmission configuration states correspond to two or more different SRS configurations.

Figure 8:
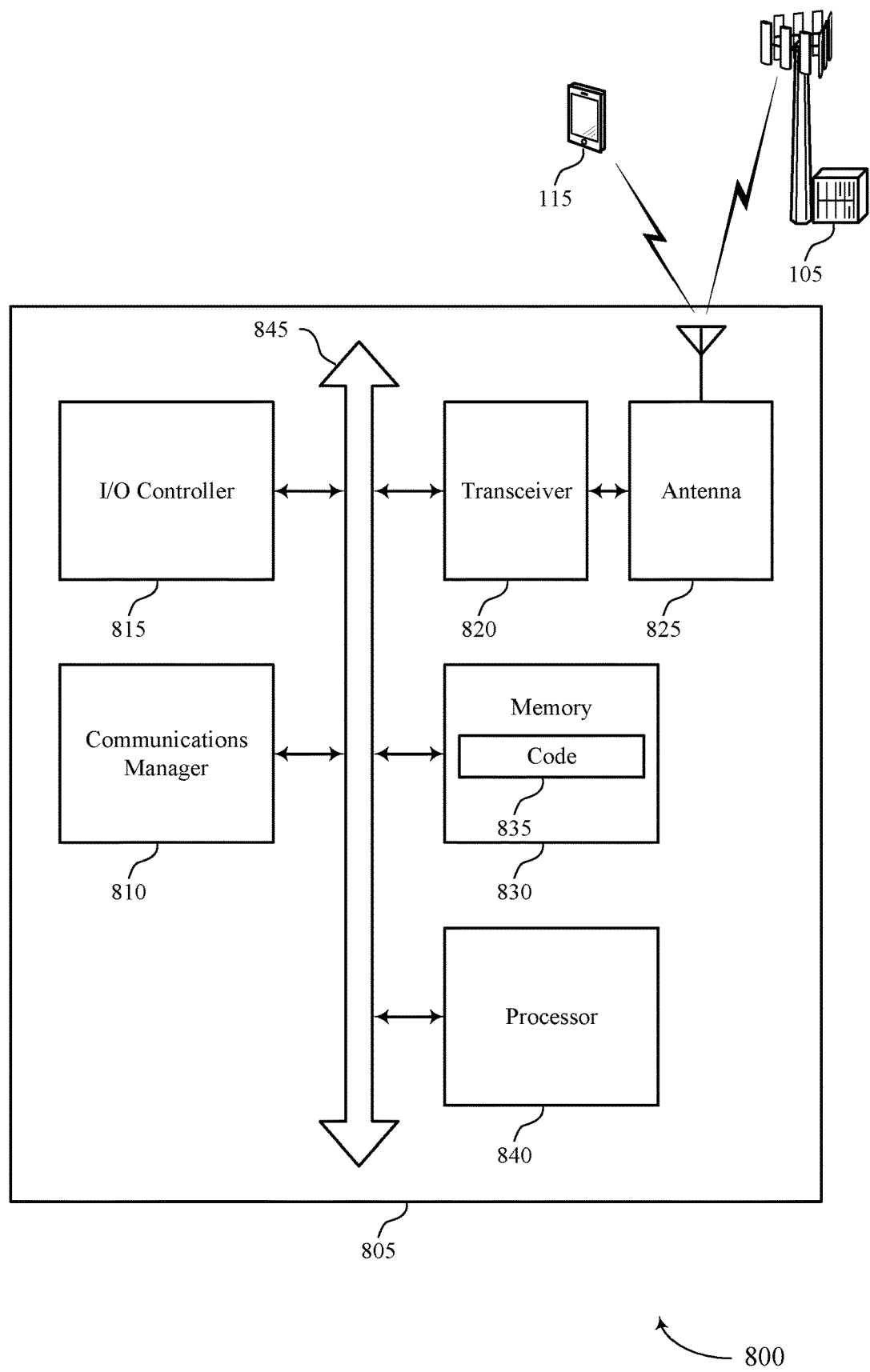
FIG. 8 shows a diagram of a system including a device that supports uplink transmission adaptation based on transmission configuration state in accordance with aspects of the present disclosure.

FIG. 8 shows a diagram of a system 800 including a device 805 that supports uplink transmission adaptation based on transmission configuration state in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify, at a UE, a set of uplink transmission configuration states, each uplink transmission configuration state having a corresponding set of uplink transmission parameters associated with one or more of a directional uplink transmission beam or a set of base stations to jointly receive an uplink transmission, receive an indication of a first uplink transmission configuration state of the set of uplink transmission configuration states for the uplink transmission, and transmit the uplink transmission based on a first set of uplink transmission parameters that are associated with the first uplink transmission configuration state.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink transmission adaptation based on transmission configuration state).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
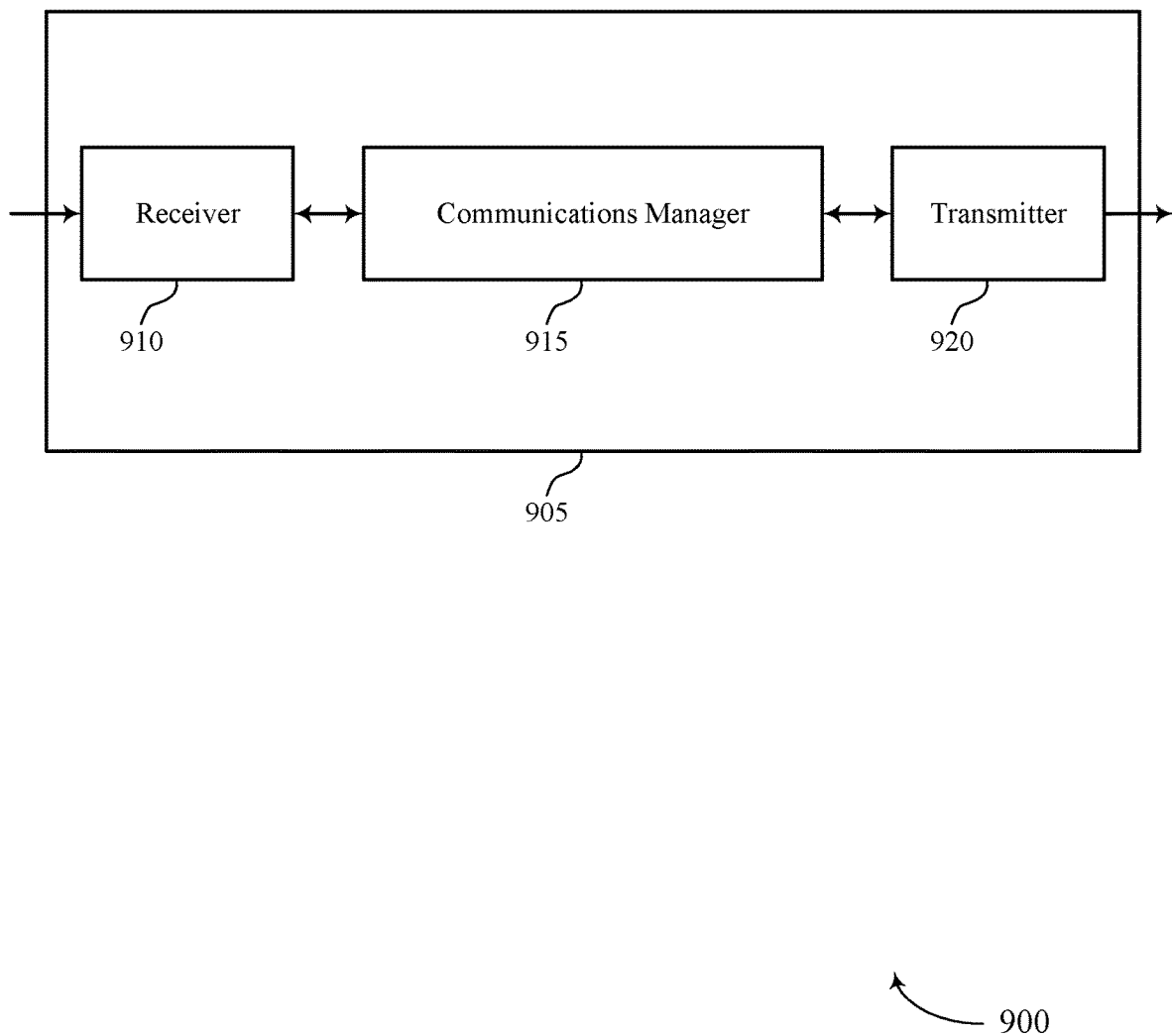
FIGS. 9 and 10 show block diagrams of devices that support uplink transmission adaptation based on transmission configuration state in accordance with aspects of the present disclosure.

FIG. 9 shows a block diagram 900 of a device 905 that supports uplink transmission adaptation based on transmission configuration state in accordance with aspects of the present disclosure. The device 905 may be an example of aspects of a base station as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink transmission adaptation based on transmission configuration state, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may configure, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission, transmit an indication of a first uplink transmission configuration state of the set of uplink transmission configuration states for the uplink transmission, and receive the uplink transmission based on a first set of uplink transmission parameters that are associated with the first uplink transmission configuration state. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
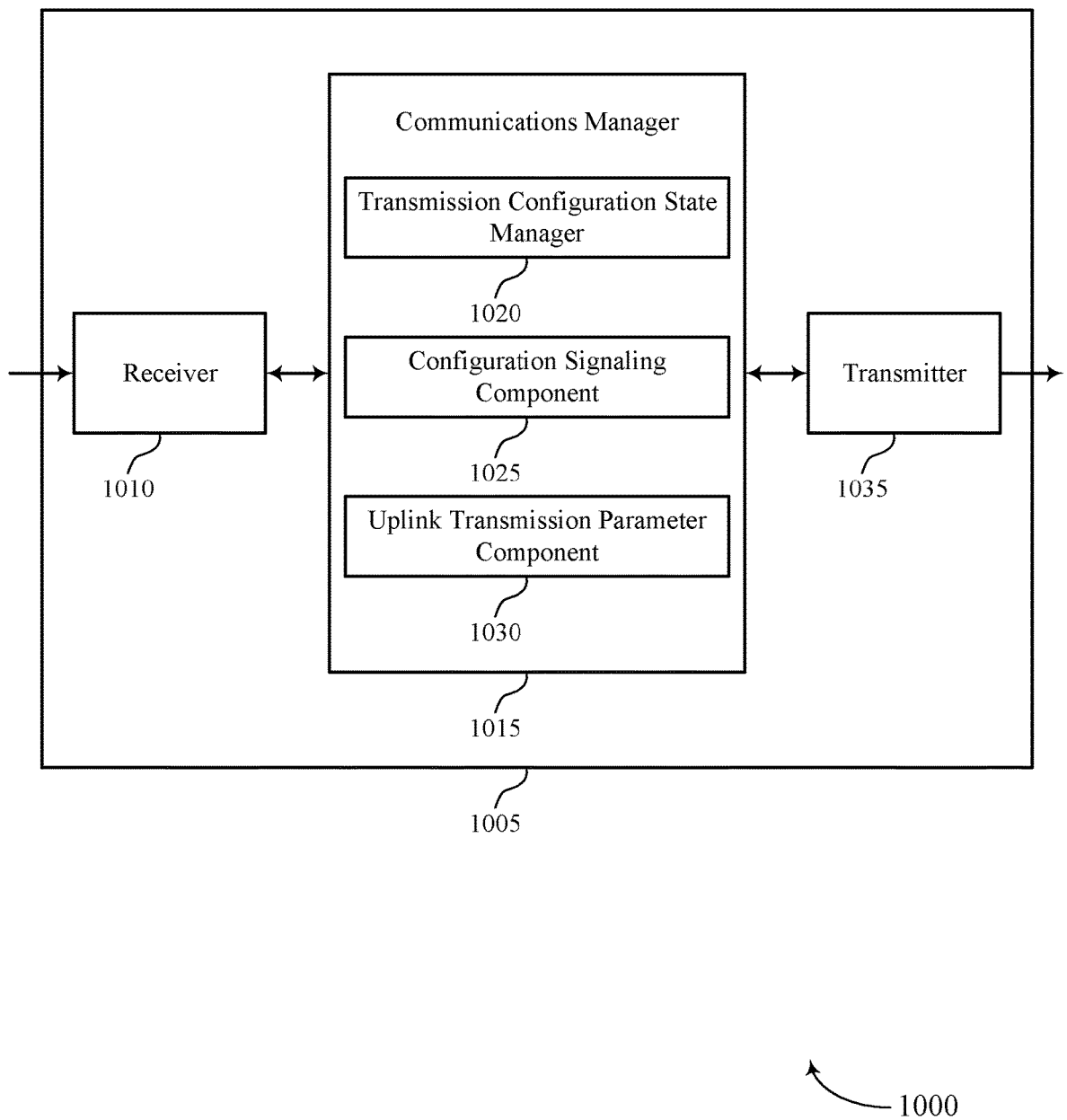

FIG. 10 shows a block diagram 1000 of a device 1005 that supports uplink transmission adaptation based on transmission configuration state in accordance with aspects of the present disclosure. The device 1005 may be an example of aspects of a device 905 or a base station as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink transmission adaptation based on transmission configuration state, etc.). Information may be passed on to other components of the device 1005.

The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a transmission configuration state manager 1020, a configuration signaling component 1025, and an uplink transmission parameter component 1030. The communications manager 1015 may be an example of aspects of the communications manager 1210 described herein.

The transmission configuration state manager 1020 may configure a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission.

The configuration signaling component 1025 may transmit an indication of a first uplink transmission configuration state of the set of uplink transmission configuration states for the uplink transmission.

The uplink transmission parameter component 1030 may receive the uplink transmission based on a first set of uplink transmission parameters that are associated with the first uplink transmission configuration state.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
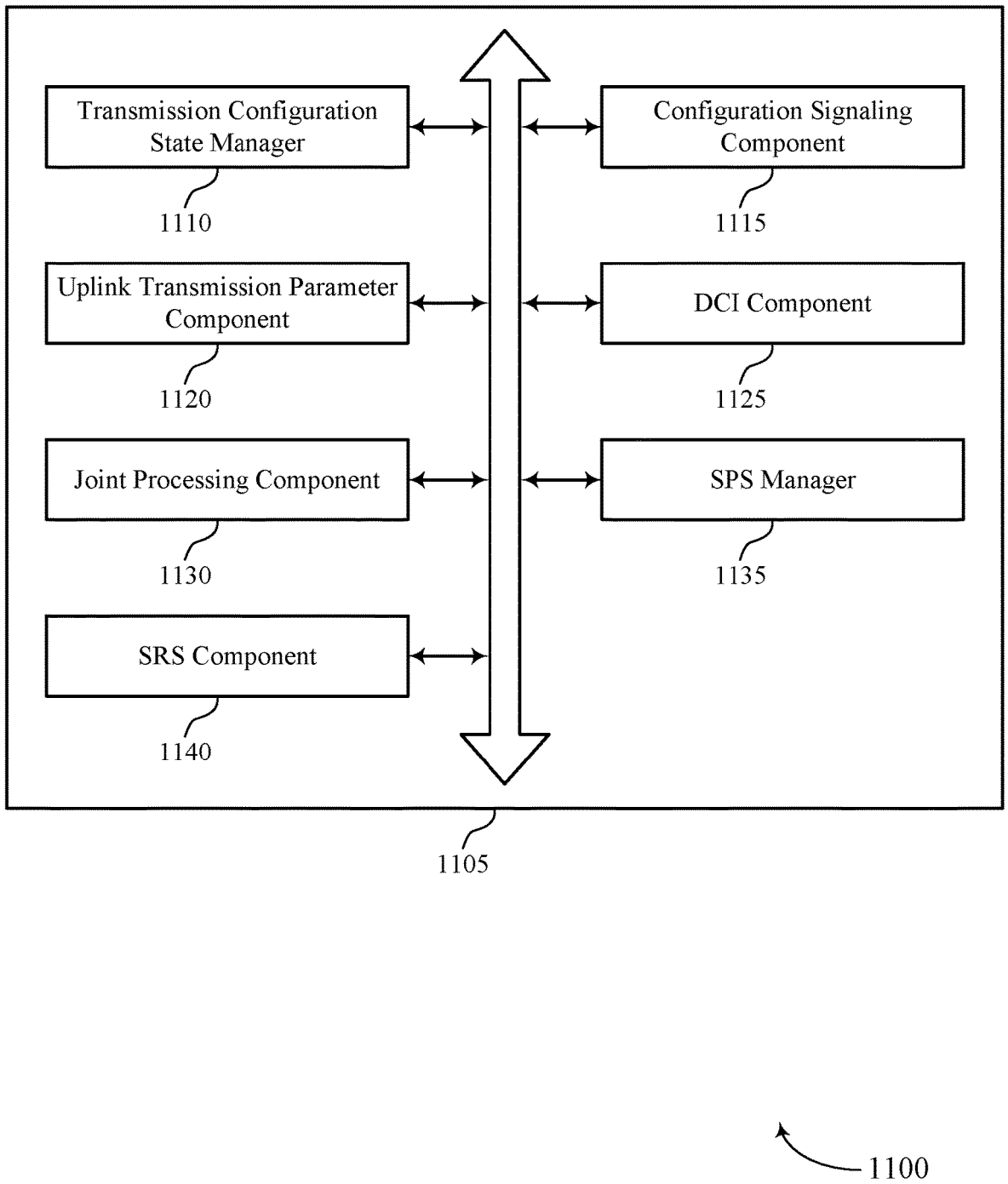
FIG. 11 shows a block diagram of a communications manager that supports uplink transmission adaptation based on transmission configuration state in accordance with aspects of the present disclosure.

FIG. 11 shows a block diagram 1100 of a communications manager 1105 that supports uplink transmission adaptation based on transmission configuration state in accordance with aspects of the present disclosure. The communications manager 1105 may be an example of aspects of a communications manager 915, a communications manager 1015, or a communications manager 1210 described herein. The communications manager 1105 may include a transmission configuration state manager 1110, a configuration signaling component 1115, an uplink transmission parameter component 1120, a DCI component 1125, a joint processing component 1130, a SPS manager 1135, and a SRS component 1140. Each of these modules may communicate, directly or indirectly, with one another (e.g., via one or more buses).

The transmission configuration state manager 1110 may configure a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission. In some cases, the set of uplink transmission configuration states includes uplink configuration states for uplink control channel transmissions, uplink shared channel transmissions, SRS transmissions, or combinations thereof. In some cases, the set of uplink transmission parameters includes one or more of a payload configuration for uplink control information to be transmitted in the uplink transmission, a payload format for the uplink control information, an uplink control channel format, a transmission power for the uplink transmission, a bandwidth for the uplink transmission, or any combinations thereof.

The configuration signaling component 1115 may transmit an indication of a first uplink transmission configuration state of the set of uplink transmission configuration states for the uplink transmission. In some examples, the configuration signaling component 1115 may transmit to the UE, via RRC signaling or a MAC-CE, a corresponding set of uplink transmission parameters for each uplink configuration state of the set of uplink transmission configuration states.

The uplink transmission parameter component 1120 may receive the uplink transmission based on a first set of uplink transmission parameters that are associated with the first uplink transmission configuration state.

The DCI component 1125 may transmit downlink control information that includes a first downlink TCI for an associated PDSCH transmission, and where the first uplink transmission configuration state is mapped to the first downlink TCI.

The joint processing component 1130 may provide the received uplink transmission to a base station controller for joint processing of another reception of the uplink transmission by a second base station.

The SPS manager 1135 may transmit a MAC-CE command or DCI that indicates the first transmission configuration state. In some cases, the uplink transmission is a semi-persistent scheduling (SPS) transmission via a PUSCH, and where the set of uplink transmission parameters includes one or more of a MCS for the uplink transmission, resource allocation for the uplink transmission, a transmission power for the uplink transmission, or any combinations thereof. In some cases, the indication of the first uplink transmission configuration state is provided in a group common DCI transmission.

The SRS component 1140 may determine one or more downlink transmission parameters for downlink transmission to the UE based on the first SRS and the one or more other SRSs received from the UE. In some cases, the uplink transmission is a SRS transmission, and where each uplink transmission configuration state of the set of uplink transmission configuration states corresponds to a different SRS configuration. In some cases, the receiving the uplink transmission includes receiving, from the UE, a first SRS based on the first uplink transmission configuration state and one or more other SRSs based on one or more other uplink transmission configuration states of the set of transmission configuration states.

Figure 12:
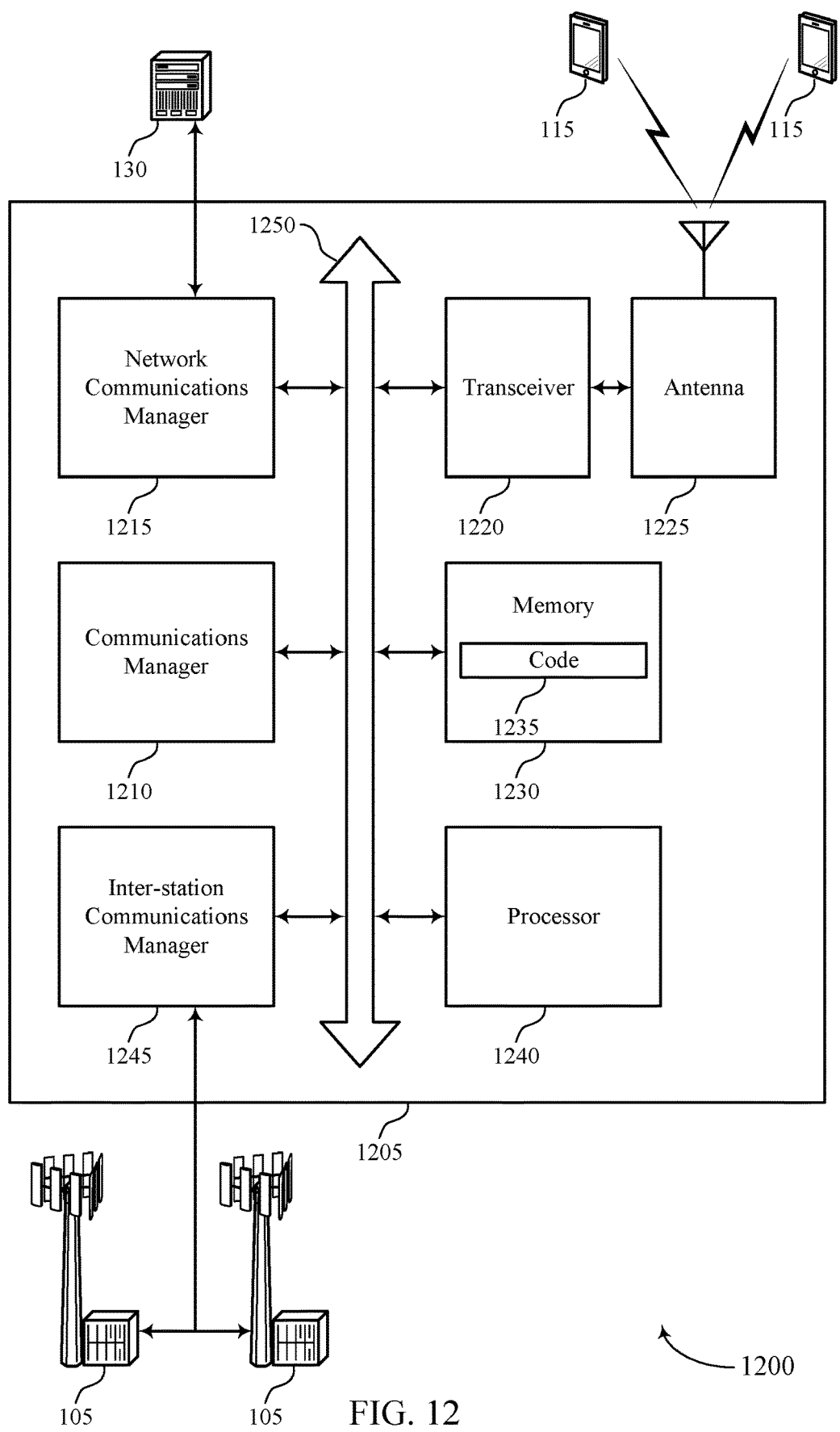
FIG. 12 shows a diagram of a system including a device that supports uplink transmission adaptation based on transmission configuration state in accordance with aspects of the present disclosure.

FIG. 12 shows a diagram of a system 1200 including a device 1205 that supports uplink transmission adaptation based on transmission configuration state in accordance with aspects of the present disclosure. The device 1205 may be an example of or include the components of device 905, device 1005, or a base station as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may configure, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission, transmit an indication of a first uplink transmission configuration state of the set of uplink transmission configuration states for the uplink transmission, and receive the uplink transmission based on a first set of uplink transmission parameters that are associated with the first uplink transmission configuration state.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting uplink transmission adaptation based on transmission configuration state).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
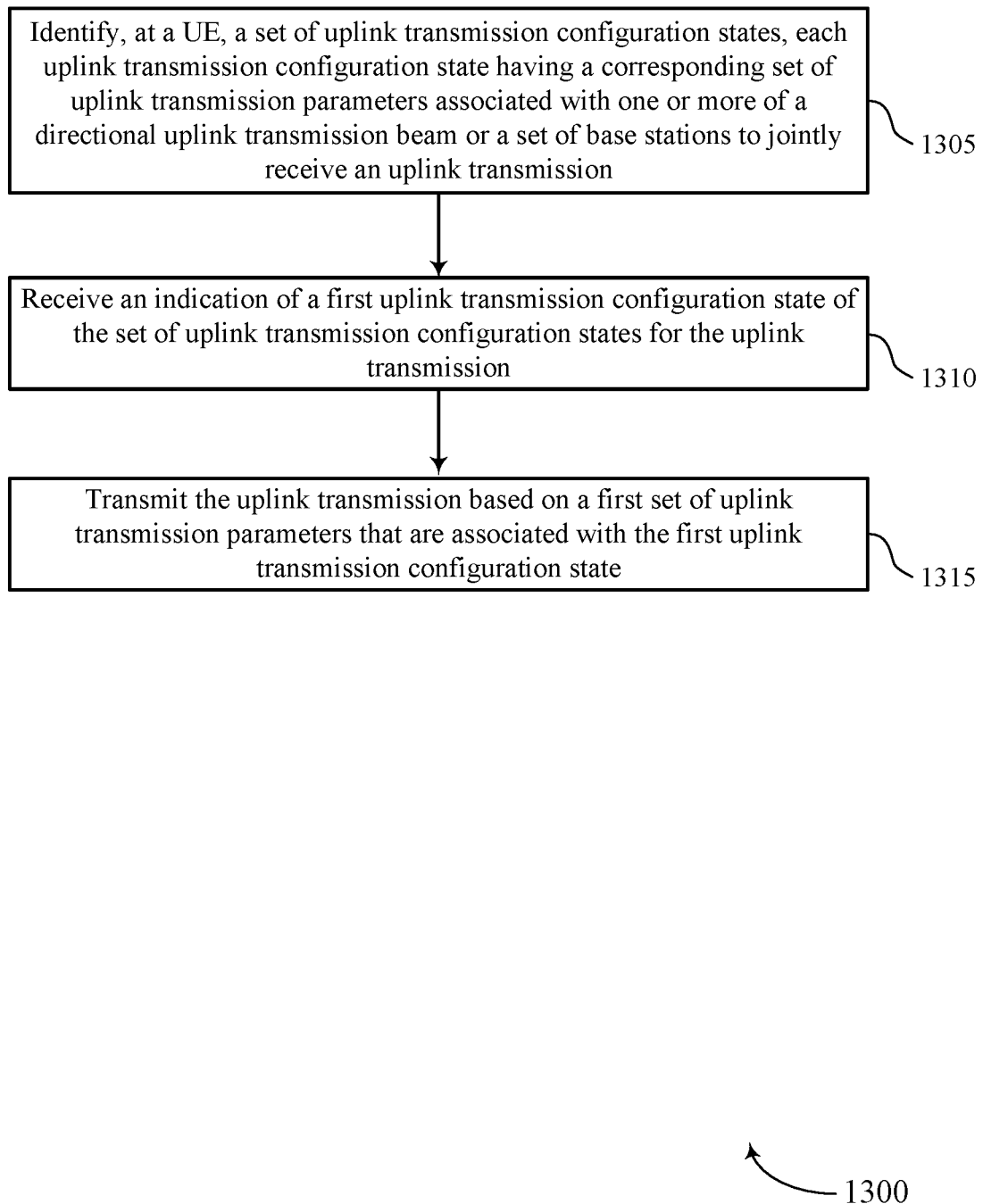
FIGS. 13 through 15 show flowcharts illustrating methods that support uplink transmission adaptation based on transmission configuration state in accordance with aspects of the present disclosure.

FIG. 13 shows a flowchart illustrating a method 1300 that supports uplink transmission adaptation based on transmission configuration state in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a set of uplink transmission configuration states, each uplink transmission configuration state having a corresponding set of uplink transmission parameters associated with one or more of a directional uplink transmission beam or a set of base stations to jointly receive an uplink transmission. The operations of 1305 may be performed according to the methods described herein. In some examples, aspects of the operations of 1305 may be performed by a transmission configuration state manager as described with reference to FIGS. 5 through 8. In some cases, the set of uplink transmission configuration states includes configuration states for uplink control channel transmissions, uplink shared channel transmissions, SRS transmissions, or combinations thereof. In some cases, the set of uplink transmission parameters includes one or more of a payload configuration for control information to be transmitted in an uplink control channel transmission, a payload format for the control information, an uplink control channel format, a transmission power for the uplink transmission, a bandwidth for the uplink transmission, or any combinations thereof. In some cases, the UE may receive, for each uplink transmission configuration state of the set of uplink transmission configuration states, a corresponding set of uplink transmission parameters. In some cases, the receiving is via RRC signaling or a MAC-CE.

At 1310, the UE may receive an indication of a first uplink transmission configuration state of the set of uplink transmission configuration states for the uplink transmission. The operations of 1310 may be performed according to the methods described herein. In some examples, aspects of the operations of 1310 may be performed by an uplink transmission manager as described with reference to FIGS. 5 through 8. In some cases, the indication of the first uplink transmission configuration state is received in downlink control information associated with a downlink transmission from a base station. In some cases, the downlink control information includes a first downlink transmission configuration indication (TCI) that indicates one or more receive parameters for receiving a PDSCH transmission, and where the first uplink transmission configuration state is mapped to the first TCI.

In some cases, the uplink transmission is a semi-persistent scheduling (SPS) transmission via a PUSCH, and where the set of uplink transmission parameters includes one or more of a MCS for the uplink transmission, resource allocation for the uplink transmission, a transmission power for the uplink transmission, or any combinations thereof. In some cases, the UE may receive a MAC-CE command or DCI that indicates the first uplink transmission configuration state. In some cases, the indication of the first uplink transmission configuration state is received in a group common DCI transmission.

At 1315, the UE may transmit the uplink transmission based on a first set of uplink transmission parameters that are associated with the first uplink transmission configuration state. The operations of 1315 may be performed according to the methods described herein. In some examples, aspects of the operations of 1315 may be performed by an uplink transmission parameter component as described with reference to FIGS. 5 through 8. In some cases, the uplink transmission is a PUCCH, PUSCH, or SRS transmission, and where two or more of the uplink configuration states of the set of uplink transmission configuration states correspond to two or more different SRS configurations. In some cases, the UE may transmit a first SRS based on the first uplink transmission configuration state, and transmit one or more other SRSs based on one or more other uplink configuration states of the set of uplink transmission configuration states.

Figure 14:
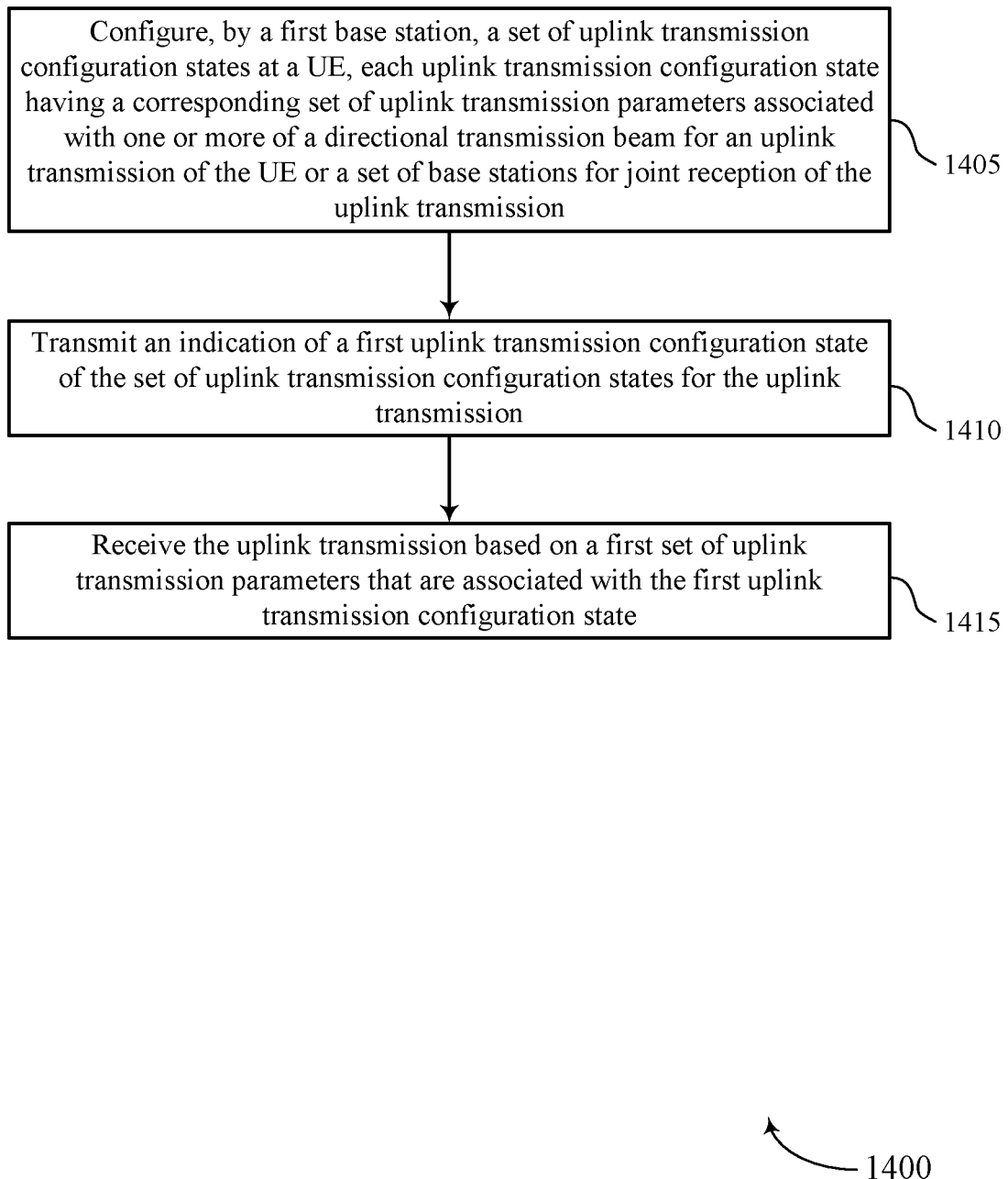

FIG. 14 shows a flowchart illustrating a method 1400 that supports uplink transmission adaptation based on transmission configuration state in accordance with aspects of the present disclosure. The operations of method 1400 may be implemented by a base station or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may configure a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission. The operations of 1405 may be performed according to the methods described herein. In some examples, aspects of the operations of 1405 may be performed by a transmission configuration state manager as described with reference to FIGS. 9 through 12. In some cases, the set of uplink transmission configuration states includes uplink configuration states for uplink control channel transmissions, uplink shared channel transmissions, SRS transmissions, or combinations thereof. In some cases, the set of uplink transmission parameters includes one or more of a payload configuration for uplink control information to be transmitted in the uplink transmission, a payload format for the uplink control information, an uplink control channel format, a transmission power for the uplink transmission, a bandwidth for the uplink transmission, or any combinations thereof.

At 1410, the base station may transmit an indication of a first uplink transmission configuration state of the set of uplink transmission configuration states for the uplink transmission. The operations of 1410 may be performed according to the methods described herein. In some examples, aspects of the operations of 1410 may be performed by a configuration signaling component as described with reference to FIGS. 9 through 12.

At 1415, the base station may receive the uplink transmission based on a first set of uplink transmission parameters that are associated with the first uplink transmission configuration state. The operations of 1415 may be performed according to the methods described herein. In some examples, aspects of the operations of 1415 may be performed by an uplink transmission parameter component as described with reference to FIGS. 9 through 12.

Figure 15:
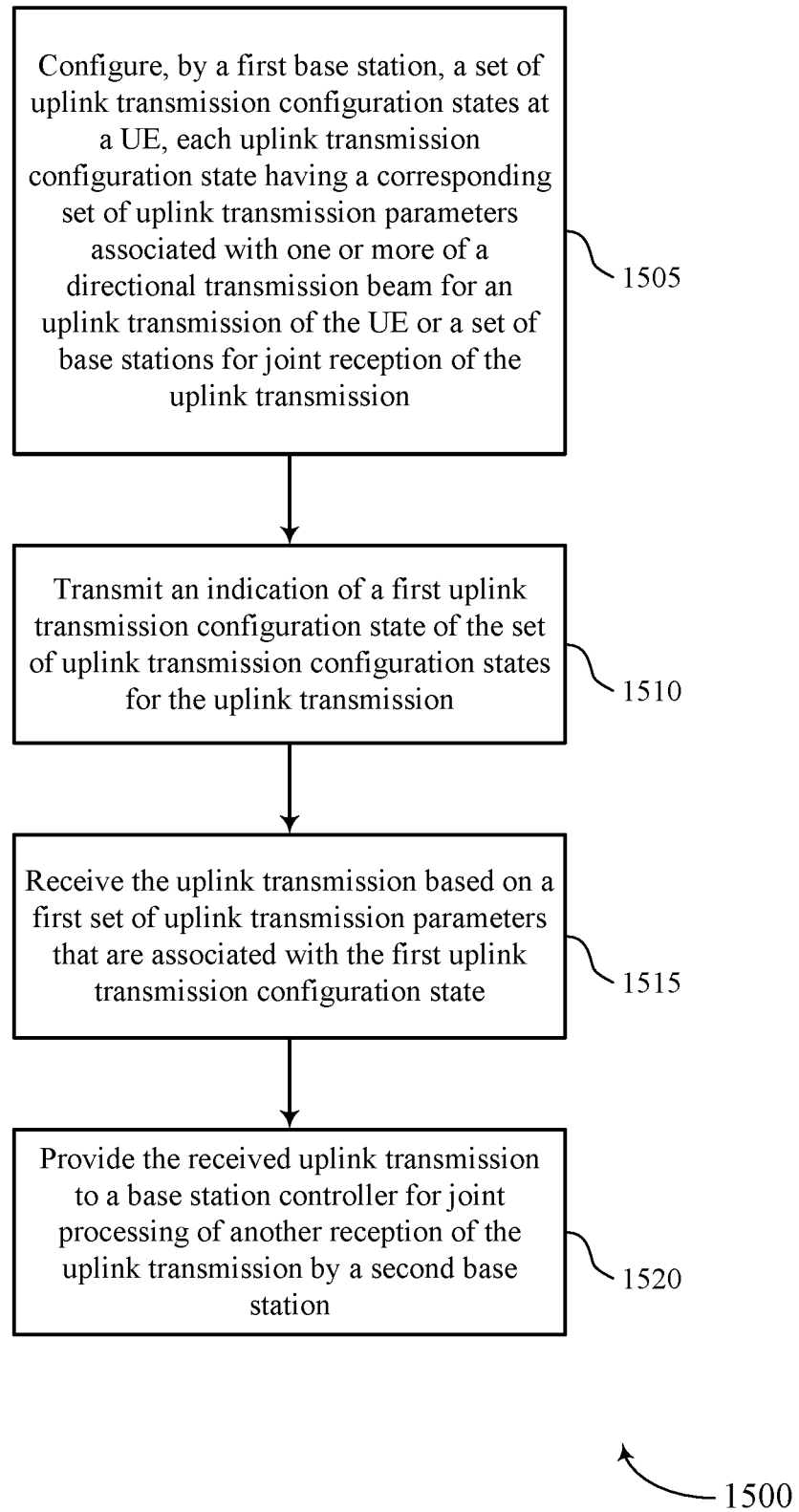

FIG. 15 shows a flowchart illustrating a method 1500 that supports uplink transmission adaptation based on transmission configuration state in accordance with aspects of the present disclosure. The operations of method 1500 may be implemented by a base station or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may configure a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission. The operations of 1505 may be performed according to the methods described herein. In some examples, aspects of the operations of 1505 may be performed by a transmission configuration state manager as described with reference to FIGS. 9 through 12.

At 1510, the base station may transmit an indication of a first uplink transmission configuration state of the set of uplink transmission configuration states for the uplink transmission. The operations of 1510 may be performed according to the methods described herein. In some examples, aspects of the operations of 1510 may be performed by a configuration signaling component as described with reference to FIGS. 9 through 12.

At 1515, the base station may receive the uplink transmission based on a first set of uplink transmission parameters that are associated with the first uplink transmission configuration state. The operations of 1515 may be performed according to the methods described herein. In some examples, aspects of the operations of 1515 may be performed by an uplink transmission parameter component as described with reference to FIGS. 9 through 12.

At 1520, the base station may provide the received uplink transmission to a base station controller for joint processing of another reception of the uplink transmission by a second base station. The operations of 1520 may be performed according to the methods described herein. In some examples, aspects of the operations of 1520 may be performed by a joint processing component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Various described aspects of the present disclosure, and combinations of the various described aspects, may be implemented in numerous different embodiments that incorporate combinations of described features. A number of exemplary embodiments are listed below.

Embodiment 1

A method of wireless communication, comprising: identifying, at a UE, a set of uplink transmission configuration states, each uplink transmission configuration state having a corresponding set of uplink transmission parameters associated with one or more of a directional uplink transmission beam or a set of base stations to jointly receive an uplink transmission; receiving an indication of a first uplink transmission configuration state of the set of uplink transmission configuration states for the uplink transmission; and transmitting the uplink transmission based at least in part on a first set of uplink transmission parameters that are associated with the first uplink transmission configuration state.

Embodiment 2

The method of embodiment 1, wherein the set of uplink transmission configuration states includes configuration states for uplink control channel transmissions, uplink shared channel transmissions, SRS transmissions, or combinations thereof.

Embodiment 3

The method of any of embodiments 1 or 2, wherein the set of uplink transmission parameters comprises one or more of a payload configuration for control information to be transmitted in an uplink control channel transmission, a payload format for the control information, an uplink control channel format, a transmission power for the uplink transmission, a bandwidth for the uplink transmission, or any combinations thereof.

Embodiment 4

The method of any of embodiments 1 to 3, wherein the identifying the set of uplink transmission configuration states comprises receiving, via RRC signaling or a MAC-CE, for each uplink transmission configuration state of the set of uplink transmission configuration states, a corresponding set of uplink transmission parameters.

Embodiment 5

The method of any of embodiments 1 to 4, wherein the indication of the first uplink transmission configuration state is received in downlink control information associated with a downlink transmission from a base station.

Embodiment 6

The method of embodiment 5, wherein the downlink control information includes a first downlink TCI that indicates one or more receive parameters for receiving a PDSCH transmission, and wherein the first uplink transmission configuration state is mapped to the first TCI.

Embodiment 7

The method of any of embodiments 1 to 6, wherein the uplink transmission is a SPS transmission via a PUSCH, and wherein the set of uplink transmission parameters comprises one or more of a MCS for the uplink transmission, resource allocation for the uplink transmission, a transmission power for the uplink transmission, or any combinations thereof.

Embodiment 8

The method of any of embodiments 1 to 7, wherein the receiving the indication of the first uplink transmission configuration state comprises receiving a MAC-CE command or DCI that indicates the first uplink transmission configuration state.

Embodiment 9

The method of embodiment 8, wherein the indication of the first uplink transmission configuration state is received in a group common DCI transmission.

Embodiment 10

The method of any of embodiments 1 to 9, wherein the uplink transmission is a SRS transmission, and wherein two or more of the uplink configuration states of the set of uplink transmission configuration states correspond to two or more different SRS configurations.

Embodiment 11

The method of any of embodiments 1 to 10, wherein the transmitting comprises transmitting a first SRS based on the first uplink transmission configuration state, and transmitting one or more other SRSs based on one or more other uplink configuration states of the set of uplink transmission configuration states.

Embodiment 12

A method for wireless communication, comprising: configuring, by a first base station, a set of uplink transmission configuration states at a UE, each uplink transmission configuration state having a corresponding set of uplink transmission parameters associated with one or more of a directional transmission beam for an uplink transmission of the UE or a set of base stations for joint reception of the uplink transmission; transmitting an indication of a first uplink transmission configuration state of the set of uplink transmission configuration states for the uplink transmission; and receiving the uplink transmission based at least in part on a first set of uplink transmission parameters that are associated with the first uplink transmission configuration state.

Embodiment 13

The method of embodiment 12, wherein the set of uplink transmission configuration states includes uplink configuration states for uplink control channel transmissions, uplink shared channel transmissions, SRS transmissions, or combinations thereof.

Embodiment 14

The method of any of embodiments 12 to 13, wherein the set of uplink transmission parameters comprises one or more of a payload configuration for uplink control information to be transmitted in the uplink transmission, a payload format for the uplink control information, an uplink control channel format, a transmission power for the uplink transmission, a bandwidth for the uplink transmission, or any combinations thereof.

Embodiment 15

The method of any of embodiments 12 to 14, wherein the transmitting the indication of the first uplink transmission configuration state comprises: transmitting downlink control information that includes a first downlink TCI for an associated PDSCH transmission, and wherein the first uplink transmission configuration state is mapped to the first downlink TCI.

Embodiment 16

The method of any of embodiments 12 to 15, wherein the configuring the set of uplink transmission configuration states comprises transmitting to the UE, via RRC signaling or a MAC-CE, a corresponding set of uplink transmission parameters for each uplink configuration state of the set of uplink transmission configuration states.

Embodiment 17

The method of any of embodiments 12 to 16, further comprising providing the received uplink transmission to a base station controller for joint processing of another reception of the uplink transmission by a second base station.

Embodiment 18

The method of any of embodiments 12 to 17, wherein the uplink transmission is a SPS transmission via a PUSCH, and wherein the set of uplink transmission parameters comprises one or more of a MCS for the uplink transmission, resource allocation for the uplink transmission, a transmission power for the uplink transmission, or any combinations thereof, and wherein the transmitting the indication of the first uplink transmission configuration state comprises transmitting a MAC-CE command or DCI that indicates the first transmission configuration state.

Embodiment 19

The method of embodiment 18, wherein the indication of the first uplink transmission configuration state is provided in a group common DCI transmission.

Embodiment 20

The method of any of embodiments 12 to 19, wherein the uplink transmission is a SRS transmission, and wherein each uplink transmission configuration state of the set of uplink transmission configuration states corresponds to a different SRS configuration.

Embodiment 21

The method of any of embodiments 12 to 20, wherein the receiving the uplink transmission comprises receiving, from the UE, a first SRS based on the first uplink transmission configuration state and one or more other SRSs based on one or more other uplink transmission configuration states of the set of transmission configuration states.

Embodiment 22

The method of embodiment 21, further comprising determining one or more downlink transmission parameters for downlink transmission to the UE based at least in part on the first SRS and the one or more other SRSs received from the UE.

Embodiment 23

An apparatus comprising at least one means for performing a method of any of embodiments 1 to 11.

Embodiment 24

An apparatus for wireless communications comprising a processor; memory in electronic communication with the processor; and instructions stored in the memory and executable by the processor to cause the apparatus to perform a method of any of embodiments 1 to 11.

Embodiment 25

A non-transitory computer-readable medium storing code for wireless communications, the code comprising instructions executable by a processor to perform a method of any of embodiments 1 to 11.

Embodiment 23

An apparatus comprising at least one means for performing a method of any of embodiments 12 to 22.

Embodiment 24

An apparatus for wireless communications comprising a processor; memory in electronic communication with the processor; and instructions stored in the memory and executable by the processor to cause the apparatus to perform a method of any of embodiments 12 to 22.

Embodiment 25

A non-transitory computer-readable medium storing code for wireless communications, the code comprising instructions executable by a processor to perform a method of any of embodiments 12 to 22.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving an indication of a first uplink transmission configuration state of a set of uplink transmission configuration states, wherein the first uplink transmission configuration state maps to a first set of uplink transmission parameters for the UE to use to communicate an uplink transmission, the first set of uplink transmission parameters associated with one or more of a direction uplink transmission beam or a set of base stations to jointly receive the uplink transmission; and
transmitting the uplink transmission using the first set of uplink transmission parameters that are mapped to the first uplink transmission configuration state based at least in part on receiving the indication.

2. The method of claim 1, wherein the set of uplink transmission configuration states includes configuration states for uplink control channel transmissions, uplink shared channel transmissions, sounding reference signal (SRS) transmissions, or combinations thereof.

3. The method of claim 1, wherein the first set of uplink transmission parameters comprises one or more of a payload configuration for control information to be transmitted in an uplink control channel transmission, a payload format for the control information, an uplink control channel format, a transmission power for the uplink transmission, a bandwidth for the uplink transmission, or any combinations thereof.

4. The method of claim 1, further comprising:
receiving, for each uplink transmission configuration state of the set of uplink transmission configuration states, a corresponding set of uplink transmission parameters, wherein the receiving is via radio resource control (RRC) signaling or a medium access control (MAC) control element (CE).

5. The method of claim 1, wherein the indication of the first uplink transmission configuration state is received in downlink control information associated with a downlink transmission from a base station.

6. The method of claim 5, wherein the downlink control information includes a first downlink transmission configuration indication (TCI) that indicates one or more receive parameters for receiving a PDSCH transmission, and wherein the first uplink transmission configuration state is mapped to the first downlink TCI.

7. The method of claim 1, wherein the uplink transmission is a semi-persistent scheduling (SPS) transmission via a physical uplink shared channel (PUSCH), and wherein the first set of uplink transmission parameters comprises one or more of a modulation and coding scheme (MCS) for the uplink transmission, resource allocation for the uplink transmission, a transmission power for the uplink transmission, or any combinations thereof, and wherein the indication of the first uplink transmission configuration state is received via a medium access control (MAC) control element (CE) command or downlink control information (DCI) that indicates the first uplink transmission configuration state.

8. The method of claim 1, wherein the uplink transmission is a sounding reference signal (SRS) transmission, and wherein two or more of the set of uplink transmission configuration states of the set of uplink transmission configuration states correspond to two or more different SRS configurations.

9. The method of claim 8, wherein the transmitting comprises:
transmitting a first SRS based on the first uplink transmission configuration state, and transmitting one or more other SRSs based on one or more other uplink configuration states of the set of uplink transmission configuration states.

10. A method for wireless communication at a base station, comprising:
transmitting an indication of a first uplink transmission configuration state of a set of uplink transmission configuration states configured at a user equipment (UE), wherein the first uplink transmission configuration state maps to a first set of uplink transmission parameters for the UE for the UE to use to communicate an uplink transmission, the first set of uplink transmission parameters associated with one or more of a direction uplink transmission beam and a set of base stations to jointly receive the uplink transmission; and
receiving the uplink transmission according to the first set of uplink transmission parameters that are mapped to the first uplink transmission configuration state based at least in part on receiving the indication.

11. The method of claim 10, wherein the set of uplink transmission configuration states includes uplink transmission configuration states for uplink control channel transmissions, uplink shared channel transmissions, sounding reference signal (SRS) transmissions, or combinations thereof.

12. The method of claim 10, wherein the first set of uplink transmission parameters comprises one or more of a payload configuration for uplink control information to be transmitted in the uplink transmission, a payload format for the uplink control information, an uplink control channel format, a transmission power for the uplink transmission, a bandwidth for the uplink transmission, or any combinations thereof.

13. The method of claim 10, wherein the transmitting the indication of the first uplink transmission configuration state comprises:
transmitting downlink control information that includes a first downlink transmission configuration indication (TCI) for an associated physical downlink shared channel (PDSCH) transmission, and wherein the first uplink transmission configuration state is mapped to the first downlink TCI.

14. The method of claim 10, further comprising:
transmitting to the UE, via radio resource control (RRC) signaling or a medium access control (MAC) control element (CE), a corresponding set of uplink transmission parameters for each uplink configuration state of the set of uplink transmission configuration states.

15. The method of claim 10, further comprising:
providing the received uplink transmission to a base station controller for joint processing of another reception of the uplink transmission by a second base station.

16. The method of claim 10, wherein the uplink transmission is a semi-persistent scheduling (SPS) transmission via a physical uplink shared channel (PUSCH), and wherein the first set of uplink transmission parameters comprises one or more of a modulation and coding scheme (MCS) for the uplink transmission, resource allocation for the uplink transmission, a transmission power for the uplink transmission, or any combinations thereof, and wherein the indication of the first uplink transmission configuration state is transmitted via a medium access control (MAC) control element (CE) command or downlink control information (DCI) that indicates the first uplink transmission configuration state.

17. The method of claim 10, wherein the uplink transmission is a sounding reference signal (SRS) transmission, and wherein each uplink transmission configuration state of the set of uplink transmission configuration states corresponds to a different SRS configuration.

18. The method of claim 17, wherein the receiving the uplink transmission comprises receiving, from the UE, a first SRS based on the first uplink transmission configuration state and one or more other SRSs based on one or more other uplink transmission configuration states of the set of uplink transmission configuration states.

19. The method of claim 18, further comprising:
determining one or more downlink transmission parameters for downlink transmission to the UE based at least in part on the first SRS and the one or more other SRSs received from the UE.

20. An apparatus for wireless communication at a user equipment (UE), comprising:
a processor,
memory coupled with the processor; and
instructions stored in the memory and operable, when executed by the processor, to cause the apparatus to:
receive an indication of a first uplink transmission configuration state of a set of uplink transmission configuration states, wherein the first uplink transmission configuration state maps to a first set of uplink transmission parameters for the UE to use to communicate an uplink transmission, the first set of uplink transmission parameters associated with one or more of a direction uplink transmission beam or a set of base stations to jointly receive the uplink transmission; and
transmit the uplink transmission using the first set of uplink transmission parameters that are mapped to the first uplink transmission configuration state based at least in part on receiving the indication.

21. The apparatus of claim 20, wherein the set of uplink transmission configuration states includes configuration states for uplink control channel transmissions, uplink shared channel transmissions, sounding reference signal (SRS) transmissions, or combinations thereof.

22. The apparatus of claim 20, wherein the first set of uplink transmission parameters comprises one or more of a payload configuration for control information to be transmitted in an uplink control channel transmission, a payload format for the control information, an uplink control channel format, a transmission power for the uplink transmission, a bandwidth for the uplink transmission, or any combinations thereof.

23. The apparatus of claim 20, wherein the instructions are further executable by the processor to cause the apparatus to:
receive, for each uplink transmission configuration state of the set of uplink transmission configuration states, a corresponding set of uplink transmission parameters via radio resource control (RRC) signaling or a medium access control (MAC) control element (CE).

24. The apparatus of claim 20, wherein the indication of the first uplink transmission configuration state is received in downlink control information associated with a downlink transmission from a base station.

25. The apparatus of claim 24, wherein the downlink control information includes a first downlink transmission configuration indication (TCI) that indicates one or more receive parameters for receiving a PDSCH transmission, and wherein the first uplink transmission configuration state is mapped to the first downlink TCI.

26. An apparatus for wireless communication at a base station, comprising:
a processor,
memory coupled with the processor; and
instructions stored in the memory and operable, when executed by the processor, to cause the apparatus to:
transmit an indication of a first uplink transmission configuration state of a set of uplink transmission configuration states configured at a user equipment (UE), wherein the first uplink transmission configuration state maps to a first set of uplink transmission parameters for the UE for the UE to use to communicate an uplink transmission, the first set of uplink transmission parameters associated with one or more of a direction uplink transmission beam and a set of base stations to jointly receive the uplink transmission; and
receive the uplink transmission according to the first set of uplink transmission parameters that are mapped to the first uplink transmission configuration state based at least in part on receiving the indication.

27. The apparatus of claim 26, wherein the set of uplink transmission configuration states includes uplink transmission configuration states for uplink control channel transmissions, uplink shared channel transmissions, sounding reference signal (SRS) transmissions, or combinations thereof.

28. The apparatus of claim 26, wherein the first set of uplink transmission parameters comprises one or more of a payload configuration for uplink control information to be transmitted in the uplink transmission, a payload format for the uplink control information, an uplink control channel format, a transmission power for the uplink transmission, a bandwidth for the uplink transmission, or any combinations thereof.

29. The apparatus of claim 26, wherein the instructions are further executable by the processor to cause the apparatus to:
transmit downlink control information that includes a first downlink transmission configuration indication (TCI) for an associated physical downlink shared channel (PDSCH) transmission, and wherein the first uplink transmission configuration state is mapped to the first downlink TCI.

30. The apparatus of claim 26, wherein the uplink transmission is a semi-persistent scheduling (SPS) transmission via a physical uplink shared channel (PUSCH), and wherein the first set of uplink transmission parameters comprises one or more of a modulation and coding scheme (MCS) for the uplink transmission, resource allocation for the uplink transmission, a transmission power for the uplink transmission, or any combinations thereof.

\* \* \* \* \*